United States Patent
Davis et al.

(10) Patent No.: US 8,695,216 B2
(45) Date of Patent: Apr. 15, 2014

(54) MACHINE TOOLS AND METHODS FOR MACHINING TURBINE ROTOR ASSEMBLIES

(75) Inventors: Keith Richard Davis, Aloha, OR (US); David Loyd Sorensen, Sherwood, OR (US); John Winfrey Dillman, Newberg, OR (US); John Rogers Brooks, Portland, OR (US); Hitesh K. Patel, Tigard, OR (US); David Michael Briggs, Carlton, OR (US); Garrett Lindon Headrick, Newberg, OR (US); Andrew Gordon Thompson, Hendersonville, NC (US); David Ethan Ross, Tigard, OR (US); Jeremy Carl Conser, Aloha, OR (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 259 days.

(21) Appl. No.: 13/337,502

(22) Filed: Dec. 27, 2011

(65) Prior Publication Data

US 2013/0160292 A1 Jun. 27, 2013

(51) Int. Cl.
*B23P 6/00* (2006.01)
(52) U.S. Cl.
USPC ........................................ 29/889.1; 29/402.05
(58) Field of Classification Search
CPC ...... B23B 19/14; B23B 21/165; B23B 41/00; B23B 2215/76; B23B 2215/82; B23P 6/002; B23P 13/00; B23P 13/02; B23C 2215/56; B23C 2220/366

USPC ............... 29/23.51, 402.05, 557–558, 889.1, 29/889.2; 408/1 R
See application file for complete search history.

(56) References Cited

U.S. PATENT DOCUMENTS

| | | | |
|---|---|---|---|
| 1,469,566 A * | 10/1923 | Weishaupl | 29/889.2 |
| 6,571,471 B2 | 6/2003 | Hohmann | |
| 7,065,872 B2 * | 6/2006 | Ganesh et al. | 29/889.2 |
| 7,628,678 B2 | 12/2009 | Moser et al. | |
| 8,402,625 B2 * | 3/2013 | Holmes et al. | 29/281.4 |
| 2007/0193247 A1 * | 8/2007 | Daniels et al. | 59/7 |
| 2010/0058566 A1 | 3/2010 | Thompson et al. | |

* cited by examiner

*Primary Examiner* — Alexander P Taosakis
(74) *Attorney, Agent, or Firm* — DASCENZO Intellectual Property Law, P.C.

(57) ABSTRACT

Machine tools and methods for machining turbine rotor assemblies are disclosed. Some machine tools include a drill arm that pushes off of a turbine stage that is adjacent to a turbine stage to be machined. Some machine tools include a clamping arm that secures the machine tool to a turbine stage to be machined and an adjacent turbine stage. Some methods include pushing-off of a turbine stage that is adjacent to a turbine stage to be machined. Some methods include securing a machine tool to a turbine stage that is adjacent to a turbine stage to be machined. Some methods include monitoring at least one of a current delivered to a first motor and a voltage applied to the first motor and controlling a second motor in response to the monitoring. Some methods include sequentially machining a turbine stage with cutting tools having increasing lengths and/or diameters.

17 Claims, 9 Drawing Sheets

MACHINE TOOLS AND METHODS FOR MACHINING TURBINE ROTOR ASSEMBLIES

FIELD

The present disclosure relates to machine tools.

BACKGROUND

Turbines, such as steam turbines that are used to generate electricity, typically include a rotor assembly that is rotationally received within a housing, through which a working fluid passes to impart a rotation to the rotor assembly about its longitudinal axis. The rotation of the rotor assembly is then used to generate electricity.

A typical rotor assembly includes a rotor shaft that defines the axis of rotation of the rotor assembly, and several stages of blades spaced along the length of and extending from the rotor shaft. Each stage includes structure to which several blades are secured and extend around the circumference of the rotor shaft. Often, the several blades of a turbine stage are secured to the rotor shaft with pins.

Over the productive lifetime of a turbine, it may become necessary to replace one or more turbine blades and/or to repair one or more turbine blades. The size of turbine rotor assemblies may restrict the ability to transport them to a machine shop or other location that is remote from the actual location of installation of the turbine. Accordingly, it may be necessary to remove and replace the turbine blades at the location of installation of the turbine.

DETAILED DESCRIPTION

Machine tools that are specifically configured to machine turbine rotor assemblies, such as to remove the pins that securely couple turbine blades to turbine rotors, and methods associated with machining turbine rotor assemblies are disclosed herein. However, the methods disclosed herein are not required to be associated with the machine tools that are disclosed herein, and likewise, the machine tools disclosed herein are not required to be associated with the methods that are disclosed herein. Additionally, the various parts and sub-assemblies of machine tools according to the present disclosure, as well as the various steps of the methods according to the present disclosure, are not required to all machine tools and methods according to the present disclosure. Moreover, one or more of the various parts and sub-assemblies of machine tools according to the present disclosure and the various steps of the methods according to the present disclosure may define independent inventive subject matter that is separate and apart from the whole of a disclosed machine tool or method. Accordingly, such inventive subject matter is not required to be utilized with the specific machine tools and methods that are expressly disclosed herein, and such inventive subject matter may find utility in a machine tool or method that is not disclosed herein.

Figure 1:
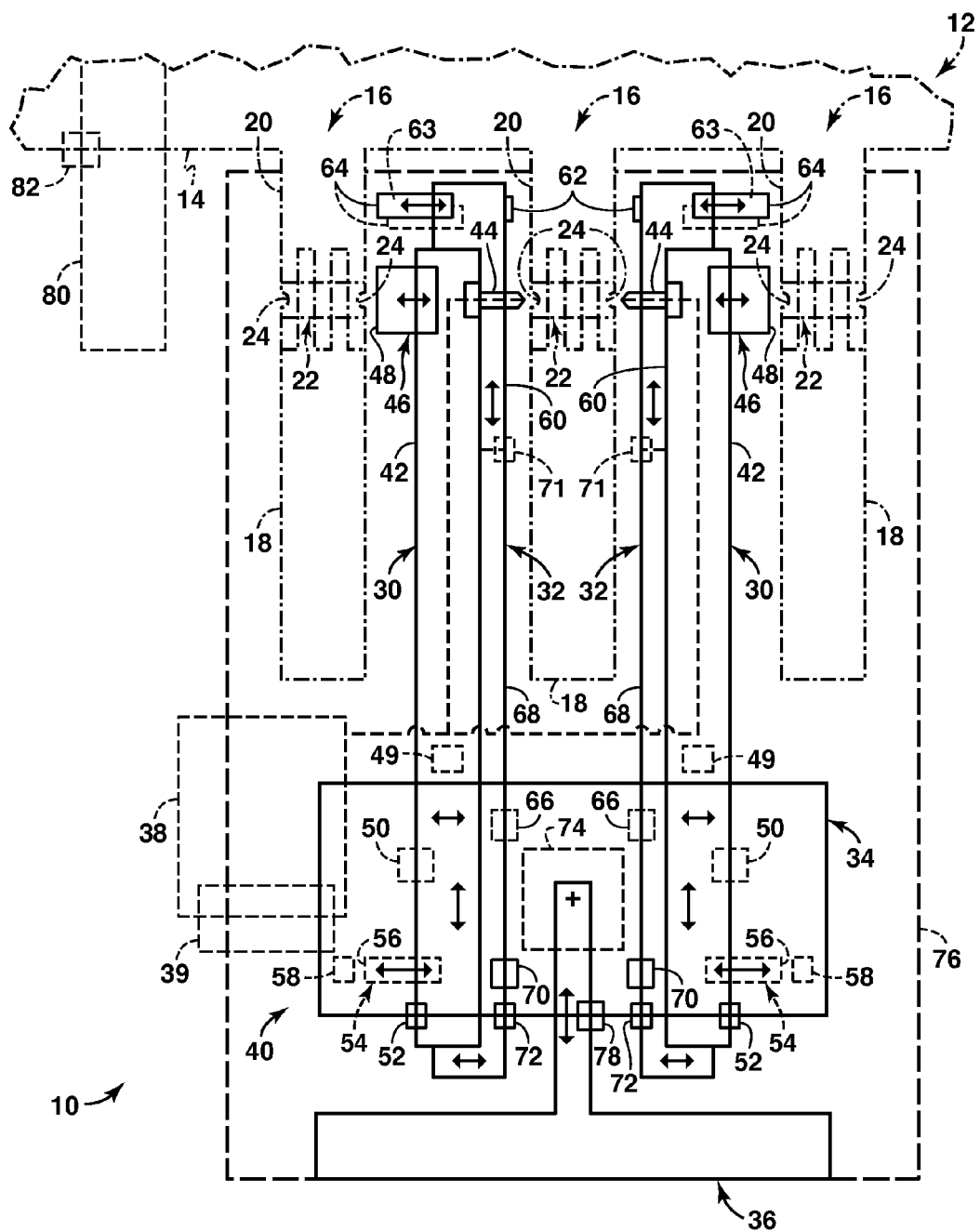
FIG. 1 is a schematic illustration representing machine tools according to the present disclosure.

Examples of machine tools according to the present disclosure are illustrated schematically in FIG. 1 and are indicated generally at 10. The diagram of FIG. 1 is schematic in nature and is provided to broadly illustrate relative relationships (including movements) between the illustrated structures, including optional structures and optional configurations of structures. FIG. 1 is not intended to be to scale or to require the illustrated relationships in all embodiments of machine tools 10. Some structures in FIG. 1 are depicted in dashed lines, with this presentation schematically indicating that the corresponding structure may be optional and/or may correspond to an optional embodiment or configuration of a machine tool 10 or component thereof; however, these schematic representations do not require that all structure shown in solid lines is required to all embodiments of a machine tool 10, and as mentioned, a part or sub-assembly of a machine tool 10 may define independent inventive subject matter, separate and apart from a machine tool 10.

Illustrated schematically in FIG. 1 in dash-dot lines is an example of a turbine rotor assembly 12, such as that may be machined, or worked on, by a machine tool 10. For purposes of providing context to the structure and functionality of machine tools 10, the turbine rotor assembly is schematically illustrated as including a turbine rotor shaft 14 and three turbine stages 16, with each stage being illustrated schematically with a single turbine rotor blade 18 coupled to the turbine rotor shaft. That said, each turbine stage of a turbine rotor assembly typically will have several turbine blades extending around the circumferences of the turbine rotor shaft. Associated with each turbine stage, the turbine rotor shaft is illustrated schematically as having structure 20 extending away from the shaft and to which the turbine blades of a turbine stage are coupled. Structure 20 additionally or alternatively may be referred to as turbine wheels 20 of the turbine rotor shaft. In the schematically illustrated example, the turbine blades and the corresponding turbine wheels include interlocking fingers that are secured together with pins 22, each having opposed center holes, or cavities, 24. Some pins may include a central bore that extends fully the length of the pin. These opposed center holes typically define, or are aligned with, the central longitudinal axes of the pins.

Other types and configurations of turbine rotor assemblies are within the scope of the present disclosure, and machine tools 10 and methods according to the present disclosure are not limited to being implemented with turbine rotor assemblies that fall within the schematic illustration of FIG. 1. For example, while machine tools 10 and methods according to the present disclosure may be described herein with respect to the drilling of pins and the reaming of pin holes such as that are associated with an interlocking finger configuration of a turbine wheel and turbine blade, machine tools 10 may be used to machine any configuration of turbine rotor assemblies, whether for the purpose of turbine blade removal or otherwise. Moreover, some of the machine tools and methods disclosed herein may find application outside of turbines, such as other work pieces that require machining in a confined space associated with the work pieces.

Machine tools 10 additionally or alternatively may be described as portable machine tools 10, because they may be configured to be used and maneuvered at the installation location of a turbine. For example, it may be impractical to transport a turbine rotor assembly to an offsite machine shop or even to a machine shop that is within the same facility as the turbine's installation location. Accordingly, machine tools 10 may be described as being configured to machine turbine rotor assemblies at their location of installation.

As schematically illustrated in FIG. 1, machine tools 10 may include one or more of a drill arm 30, a clamping arm 32, a support frame 34, a support stand 36, a coolant system 38, and a control system 39. As illustrated, some machine tools 10 include two drill arms and two clamping arms; however, it is within the scope of the present disclosure that a machine tool 10 may include one or more of a drill arm and/or a clamping arm, as well as a machine tool that includes a drill arm but not a clamping arm or a machine tool that includes a clamping art but not a drill arm. When a support frame is present, the drill arm(s) and/or clamping arm(s) are operatively coupled to the support frame, and collectively, the support frame, the drill arm(s), and the clamping arm(s) may be described as defining a drilling assembly 40. In some embodiments, the support frame may be suspended from, or otherwise operatively coupled to, the support stand. When present, the support stand may be used to appropriately position the drilling assembly in a desired location relative to a turbine rotor assembly, and more specifically, relative to a turbine stage that is to be machined by the machine tool. The support stand may be a component of the machine tool, or a separate support stand may be provided to serve the purpose of the support stand. For example, it is common for facilities that house turbines to include cranes and other equipment adapted for moving heavy equipment. Such equipment may be utilized to support drilling assemblies and machine tools according to the present disclosure without having a dedicated support stand as a component of machine tool 10.

Drill arms 30 are configured to be positioned to at least partially extend between two adjacent turbine stages 16, as schematically illustrated in FIG. 1, or in some instances to at least partially extend to the side of an end-stage, as discussed herein. Accordingly, drill arms 30 may be described as being elongate. Drill arms 30 include a drill-arm body 42 and a tool 44 that is operatively coupled, and in some embodiments removably coupled, to the drill-arm body. For example, as discussed herein, it may be desirable in some methods of utilizing a machine tool 10, to install a tool 44 in the form of a centering tool that is configured to engage and mate with a center hole 24 of a pin 22 of a turbine rotor assembly. Additionally or alternatively, however, it also may be desirable in some methods of utilizing a machine tool 10, to install a tool 44 in the form of a cutting tool. Illustrative, non-exclusive examples of cutting tools include drilling tools, such as that may be used to drill a pin 22, and reaming tools, such as that may be used to ream a hole associated with a pin 22. By having the tool removable from the drill arm, a centering tool may be utilized to position the drill arm and the drilling assembly in a desired location, and then the centering tool may be replaced with a cutting tool to machine the turbine rotor assembly in a desired location. Additionally or alternatively, cutting tools, such as drilling tools, of various lengths (or depths) and/or of various diameters may be provided, for example, depending on one or more of the spacing of turbine stages 16 and the length and/or diameter of a pin 22. As discussed herein, drill arms may be used to facilitate step-drilling, which refers to a method of sequentially increasing the length (or depth) and/or diameter of a cutting tool. For example, by sequentially increasing the length of cutting tools used, a desired depth of penetration by the cutting tools may be accomplished, despite space constraints preventing initiating the machining process with a cutting tool of a desired length. Additionally or alternatively, by sequentially increasing the diameter of cutting tools used, a desired diameter of hole may be produced, for example in an effort to completely drill out a pin 22.

When positioned to extend between two adjacent turbine stages, drill arm 30 is configured to selectively translate the tool 44 toward and into engagement with a turbine stage, for example, the middle of the three schematically illustrated turbine stages 16 of FIG. 1. For purposes of discussion and illustration, the middle turbine stage of FIG. 1 may be referred to herein as the turbine stage to be machined. Drill arm 30 facilitates this function by pushing off of the turbine stage that is directly adjacent to the turbine stage to be machined and opposite the drill-arm body. For example, with reference to the left of the two illustrated drill arms 30 in FIG. 1, the drill-arm body is positioned to the left of the turbine stage to be machined and therefore is configured to push-off of the left of the three illustrated turbine stages. Similarly, with reference to the right of the two illustrated drill arms 30 in FIG. 1, the drill-arm body is positioned to the right of the turbine stage to be machined and therefore is configured to push-off of the right of the three illustrated turbine stages.

To accomplish this functionality, drill arm 30 includes a push-off mechanism 46 that is operatively coupled to drill-arm body 42. The push-off mechanism defines an engagement surface 48 that generally faces the turbine stage that is directly adjacent to the turbine stage to be machined when the drill-arm body is positioned to extend between two adjacent turbine stages. As schematically represented by the horizontal double-headed arrow overlapping the push-off mechanism and the drill-arm body, the push-off mechanism is configured to translate the engagement surface relative to the drill-arm body, including away from the drill-arm body and toward the adjacent turbine stage. When the engagement surface engages the adjacent turbine stage and continues to be translated away from the drill-arm body, a force is applied to the drill-arm body that tends to translate toward the turbine stage to be machined.

As an illustrative, non-exclusive example, when a drill arm is positioned between two adjacent turbine stages and when a tool 44 in the form of a cutting tool is utilized, as engagement surface 48 translates away from drill-arm body 42, the cutting tool will be translated into engagement with the turbine stage to be machined so that it penetrates the turbine stage to be machined. In some embodiments, the translation of the engagement surface may be directly tied to the operation of the cutting tool, such as to the rotational output of the cutting tool, in a desired relationship. For example, depending on the configuration of the cutting tool and the material to be machined by the cutting tool, a desired translation rate of the cutting tool may be selected so as to avoid overheating of a motor associated with the cutting tool and/or to avoid the cutting tool breaking. Other criteria also may be used to select a desired translation rate.

Because drill arm 30 includes push-off mechanism 46, the cutting tool itself is not required to translate relative to drill-arm body 42. Accordingly, drill arm 30 may not be configured to translate the cutting tool, or other tool, relative to the drill-arm body during operation of the machine tool. Rather, the whole of the drill-arm body may translate together with the tool toward the turbine stage to be machined. Stated differently, in some embodiments, the cutting tool does not translate laterally relative to the drill-arm body (or in the direction of the axis of the cutting tool) during operation of the machine tool.

Drill arms 30 may include one or more motors 49 that are configured to operate the rotation of a cutting tool when operatively coupled to the drill arm, and/or the translation of the engagement surface 48 of the push-off mechanism 46. In some embodiments, a single motor 49 may operate both the cutting tool and the push-off mechanism of a drill arm. In such embodiments, appropriate gearing may be utilized to select a desired push-off rate, or rate of translation of the engagement surface relative to a desired rotational rate of the cutting tool. Alternatively, a drill arm may include two motors, with one motor operative to rotate the cutting tool and another motor operative to translate the engagement surface of the push-off mechanism. In such an embodiment, appropriate gearing may be selected to be associated with the two motors to produce a desired push-off rate, or rate of translation of the engagement surface, relative to a desired rotational rate of the cutting tool. Additionally or alternatively, when two motors are utilized, the motors may be electronically controlled to select appropriate rates associated with the cutting tool and the engagement surface.

As mentioned, drill arms 30 may be operatively coupled to a support frame 34, with the optional support frame providing a frame for manipulation of the drill arm(s) by an operator of a machine tool 10. In some embodiments, the drill-arm body is configured to be selectively translated longitudinally relative to the support frame among a plurality of longitudinal positions, including an extended position and a retracted position. This optional relationship is schematically illustrated by the vertical double-headed arrow indicated within the schematic representation of the support frame and drill-arm body.

As used herein, "selective" and "selectively," when modifying an action, movement, configuration, or other activity of one or more components or characteristics of a machine tool according to the present disclosure, mean that the specific action, movement, configuration, or other activity is a direct or indirect result of user manipulation and/or electronic control and/or mechanism control of an aspect of, or one or more components of, the machine tool or component thereof. Additionally, as used herein, the indication of "longitudinal," such as referring to an axis, to a direction of translation, or to a relative relationship between two or more components, generally refers to the long axis, or dimension, of the respective component(s). In contrast, as used herein, the indication of "lateral," such as referring to a direction of translation or a relative relationship between two or more components, generally refers to the short axis, or dimension, of the respective component(s) and/or to an axis, dimension, or direction that is perpendicular to the longitudinal axis, direction. However, the use of "longitudinal" and "lateral" should not be strictly interpreted as such, depending on the context in which these terms are used.

In FIG. 1, the drill arms are each illustrated in their extended position. Tool 44 is further away from the support frame when a drill-arm body is in its extended position than when a drill-arm body is in its retracted position. This optional relationship between a drill-arm body and the support frame permits an operator of a machine tool 10 to selectively extend the drill-arm body between two adjacent turbine stages and to selectively retract the drill-arm body from between the two adjacent stages. This functionality may be desirable, for example, to permit the changing of a tool 44 that is operatively coupled to the drill-arm body.

As an illustrative, non-exclusive example, once the drilling assembly is positioned proximate to a turbine stage to be machined, a centering tool may be installed, and when the drill-arm body is positioned to its extended position between two adjacent turbine stages, the centering tool may be utilized to find, or locate, the center of a pin 22 to be drilled. Upon engagement of the centering tool(s) with the center hole(s) 24 of the pin to be drilled (and thus the alignment of the longitudinal axis of the tool(s) with the longitudinal axis of the pin to be drilled), the support frame may be fixed in place, preserving a relative orientation of the support frame, and thus the drill-arm body, with respect to the pin to be drilled. Accordingly, once the support frame is fixed in place, the drill-arm body may be retracted from between the adjacent turbine stages, and the centering tool may be replaced with a cutting tool. Then, the drill-arm body may be translated back into its extended position, so that the cutting tool will be precisely aligned with the longitudinal axis of the pin due to the previously preserved orientation of the support frame.

Drill-arm bodies 42 and support frames 34 may include any suitable structure to facilitate the longitudinal translation of a drill-arm body relative to a support frame, when such functionality is included in a machine tool 10. As an illustrative, non-exclusive example, a drill arm or a drill-arm body may include a longitudinal rail that mates with a corresponding channel of the support frame, or vice versa. Other mechanisms also are within the scope of the present disclosure, such as (but not limited to) leadscrew mechanisms, ball screw mechanisms, and rack-and-pinion mechanisms.

In some embodiments, the drill arm and/or the support frame and/or the mechanism associated with the translational relationship between the drill-arm body and the support frame may define precisely the extended position of the drill-arm body relative to the support frame. Additionally or alternatively, the drill arm and/or the support frame may be described as defining or including a stop, or a precision stop, that is configured to define precisely the extended position. The inclusion of an extended position in which the drill-arm body may be precisely and repeatedly positioned facilitates precise positioning of tools in a desired location relative to a turbine stage to be machined. For example, as discussed, it may be desirable to first utilize a centering tool to align the drill-arm body with the axis of a pin to be drilled, then to replace the centering tool with a cutting tool, and then to precisely position the cutting tool in alignment with the axis of the pin to be drilled.

Additionally or alternatively, a drilling assembly 40 may include a locking mechanism 50 that is configured to lock a drill-arm body in a desired longitudinal position among its plurality of longitudinal positions relative to the support frame. In some embodiments, the locking mechanism, when present, may be configured to lock the drill-arm body only in its extended position and/or to at least partially define a precision stop. For example, as discussed, it may be desirable to precisely position a centering tool relative to a pin 22 to be drilled. This process by an operator of a machine tool 10 may be performed while the drill-arm body is locked in its extended position, for example, by manipulating the entirety of the drilling assembly 40. Accordingly, once the center of the pin to be drilled is found (i.e., appropriately engaged by the centering tool(s)) and aligned with the centering tool(s), and the drilling assembly is in a desired location, the drill-arm body may then be unlocked for retraction and replacement of the centering tool with a cutting tool.

In some embodiments of machine tools 10, a drill-arm body 42 may be configured to be selectively translated laterally relative to support frame 34 among a plurality of lateral positions. This relationship is schematically illustrated in FIG. 1 by the horizontal double-headed arrows within the schematic representations of the drill-arm bodies and the support frame. The lateral manipulation of a drill-arm body may provide one or more desired functions. For example, upon selectively positioning the support frame proximate to a turbine stage to be machined, a drill-arm body may be appropriately positioned between two adjacent turbine stages and within a desired distance from the turbine stage to be machined. In embodiments that include two drill arms, such as the schematically illustrated example of FIG. 1, the lateral translation of the drill-arm bodies relative to the support frame permit an operator to appropriately space the two drill arms relative to the turbine stage to be machined. Various turbine rotor assemblies may have various spacings associated with turbine stages, may have turbine stages of various widths, etc. Accordingly, an operator may appropriately manipulate the lateral position of the drill-arm bodies relative to the support frame so that the drill-arm bodies may be selectively positioned to extend on either side of a turbine stage to be machined. Drill-arm bodies 42 and support frames 34 may include any suitable structure to facilitate the lateral translation of a drill-arm body relative to a support frame. As an illustrative, non-exclusive example, a leadscrew mechanism may be utilized to permit a user to selectively translate the drill-arm body relative to the support frame. Other mechanisms also are within the scope of the present disclosure, such as (but not limited to) rail and channel structures, rack-and-pinion mechanisms, and ball screw mechanisms.

In some embodiments, although not required, when two drill arms are included in a drilling assembly, a single mechanism for laterally translating both drill arms may be used. For example, a leadscrew mechanism may include first directional threads associated with one of the two drill arms and second, opposite, directional threads associated with the other of the two drill arms, so that when the leadscrew is rotated in one direction, the two drill arms laterally translate toward each other, and when the leadscrew is rotated in the opposite direction, the two drill arms laterally translate away from each other.

In some embodiments, a drilling assembly 40 may include a user input mechanism 52 that is configured to receive user inputs to selectively translate the drill arm laterally relative to the support frame among its plurality of lateral positions. User input mechanism 52 is schematically illustrated in FIG. 1 as overlapping the drill-arm body and the support frame, schematically representing that it is operatively coupled to the drill arm and the support frame in a position to appropriately receive user inputs. Any suitable form of a user input mechanism may be utilized, and as an illustrative, non-exclusive example, when a leadscrew mechanism is utilized to facilitate the lateral translation of one or more drill arms, an input wheel operatively coupled to the screw portion of the leadscrew mechanism may be provided.

As mentioned, during operation of a machine tool 10 having a drill arm 30, the push-off mechanism 46 facilitates the translation of the drill-arm body relative to the turbine stage to be machined, so that the tool is translated toward the turbine stage to be machined. In embodiments in which the drill-arm body is operatively coupled to a support frame for relative lateral translation, the drill-arm body may be configured to freely translate in response to the function of the push-off mechanism. Accordingly, it may be desirable for the drill-arm body to be disengaged from any mechanism that otherwise would not permit for free, or floating, lateral translation. For example, in embodiments that include a leadscrew mechanism operatively coupled between the drill-arm body and the support frame, it may be desirable to be able to disengage the leadscrew mechanism. Otherwise, the friction associated with the leadscrew or other mechanism may impede the desired translation rate associated with the push-off mechanism.

Some embodiments of drill arms 30 are configured to push-off of the support frame in addition to the adjacent turbine stage for lateral translation of the drill-arm body and associated tool. Accordingly, as schematically illustrated in FIG. 1, drill arm 30 may include a second push-off mechanism 54 that is operatively coupled to drill-arm body 42, and with the second push-off mechanism defining an engagement surface 56. The second push-off mechanism additionally or alternatively may be referred to as a rear push-off mechanism 54. In embodiments that include a rear push-off mechanism, the support frame includes structure 58, which is appropriately positioned to be engaged by the rear push-off mechanism, as schematically illustrated in FIG. 1. It is within the scope of the present disclosure that a drill arm includes a rear push-off mechanism 54 but not a forward push-off mechanism 46 associated with engagement of a turbine stage that is adjacent to a turbine stage to be machined. Additionally or alternatively, rear push-off mechanism 54 may be operative to push-off structures on both sides of the drill arm, such as to translate the drill-arm body to the right or to the left, depending on the configuration and the desired movement of the drill-arm body. In such embodiments, one or both of the support frame and/or a corresponding clamping arm 32 may include additional structure that is positioned to be engaged by the rear push-off mechanism. Although schematically illustrated in FIG. 1 as generally operating on the outer sides of the two schematically illustrated drill arms, rear push-off mechanisms are not so limited and, as mentioned, may extend from either or both sides of a respective drill arm.

As schematically illustrated in FIG. 1 and discussed herein, it is within the scope of the present disclosure that a drilling assembly 40 include two drill arms 30. Such a configuration may be desirable for various reasons. As an illustrative, non-exclusive example, the pins 22 that operatively couple turbine blades 18 to a turbine wheel 20 may not be in a known orientation, and multiple pins may not all be oriented similarly, such as in a uniform horizontal or parallel orientation. Accordingly, to facilitate alignment of a cutting tool with the central axis of a pin (i.e., ensuring that the central axis of the cutting tool is co-linear with the central axis of the pin to be drilled), two drill arms may be utilized. For example, when two drill arms are included, and centering tools are operatively coupled to the respective drill-arm bodies, an operator may manipulate the drilling assembly so that the two centering tools engage opposite ends of the pin to be drilled. Then, with the support frame locked into place, one or both of the centering tools may be replaced with a cutting tool. In some circumstances, it may be desirable to only install a single cutting tool, such as a drilling tool, that will drill into the pin from a single side of the pin. In other circumstances, it may be desirable to replace both centering tools with cutting tools, so that the pin may be drilled from both sides of the pin.

As mentioned, once drill assembly 40 is appropriately positioned with the drill arms in a desired location, such as with a pair of centering tools aligned with the central axis of a pin to be drilled, a centering tool may need to be replaced with a cutting tool. To maintain the desired orientation of the drilling assembly while the drill-arm body is retracted from between two adjacent turbine stages, the support frame may be locked, or otherwise secured, in place. Otherwise, when the drill-arm body is re-extended between the two adjacent turbine stages, the cutting tool may not precisely align with the pin to be drilled, or other structure associated with the turbine stage to be machined. This may be accomplished in any suitable manner, including by locking the support frame relative to the support stand. Additionally or alternatively, a machine tool 10 and a drilling assembly 40 may include one or more clamping arms 32 that are configured to be positioned to at least partially extend between a turbine stage to be machined and an adjacent turbine stage and to selectively engage the turbine stage to be machined and/or the adjacent turbine stage to secure the drilling assembly in place. Stated differently, the engagement between a clamping arm and two adjacent turbine stages may create a foundation for precision machining of the turbine stage to be machined.

In the schematically illustrated example of FIG. 1, drilling assembly 30 includes two clamping arms that are configured to be positioned on opposite sides of a turbine stage to be machined; however, it also is within the scope of the present disclosure that a machine tool 10 includes only a single clamping arm. In FIG. 1, the clamping arms are schematically illustrated as being at least partially underneath the respective drill arms 30, schematically representing a vertical arrangement between the drill arms and the clamping arms; however, such a positional relationship is not required in all embodiments of drilling assemblies and machine tools according to the present disclosure. For example, the drilling arms may be positioned vertically underneath the clamping arms, rather than above the clamping arms. Due to the confined space between two adjacent turbine stages 16, machine tools 10 typically will include a vertically oriented relationship between clamping arms and drill arms, at least when the clamping arms and drill arms are positioned to extend between adjacent turbine stages.

As schematically illustrated in FIG. 1, a clamping arm 32 may include a clamping-arm extender 60, and clamping members 62, 64 that are operatively coupled to the clamping-arm extender. The clamping-arm extender is configured to be positioned to extend between the turbine stage to be machined and an adjacent turbine stage. When the clamping-arm extender is appropriately positioned, clamping member 62 is positioned to engage the turbine stage to be machined, and clamping member 64 is positioned to engage the adjacent turbine stage. At least one of the clamping members 62, 64 is configured to be selectively translated laterally relative to the clamping-arm extender. In FIG. 1, clamping member 64 is schematically illustrated with a horizontal double-headed arrow, representing the selective translation of clamping member 64 relative to the clamping-arm extender. However, it also is within the scope of the present disclosure that clamping member 62 may be configured to be selectively translated laterally relative to the clamping-arm extender or that both clamping members 62 and 64 may be configured to be selectively translated laterally relative to the clamping-arm extender.

With reference to the left of the two illustrated clamping arms 32 in FIG. 1, an operator may position clamping member 62 into engagement with the middle of the three illustrated turbine stages 16. Then, clamping member 64 may be translated to the left to engage the left of the three illustrated turbine stages. An appropriate clamping force may thus be applied against both of the left and center turbine stages to securely hold the clamping arm in place.

Upon engagement of both clamping members with respective adjacent turbine stages, a desired clamping force may be applied by the clamping members, with the desired clamping force being sufficient to appropriately secure the drilling assembly in a desired location, such as to provide for repeated positioning of the drill arms in their extended positions and precise alignment with a desired location on the turbine stage to be machined. It also is within the scope of the present disclosure that the mechanism utilized to translate a clamping member relative to a clamping-arm extender, and therefore to apply the desired clamping force, may be configured to limit the clamping force to a maximum clamping force. For example, it may be desirable to restrict the ability to impart a clamping force that may damage a turbine stage, such as a turbine wheel thereof.

To facilitate the translation of a clamping member relative to a clamping-arm extender, a clamping arm 32 may include a user input mechanism 66 that is configured to receive user inputs. Any suitable form of a user input mechanism may be utilized, with an input wheel being an illustrative, non-exclusive example.

Because turbine rotor assemblies are configured in various shapes and sizes with various spacings of turbine stages, it may be desirable to adjust the size and/or length and/or orientation of a clamping member 62 or clamping member 64. For example, the length of available travel of a clamping member relative to the clamping-arm extender may be limited, and therefore, the ability to position both clamping members 62, 64 relatively close to respective turbine stages may be required, so that only minimal translation of a clamping member is required to have both clamping members appropriately engage respective turbine stages and impart the desired clamping force. Accordingly, in some embodiments, spacers, or extenders, 63 may be provided so that an operator of a machine tool 10 may select an appropriate length of clamping member to extend toward and engage the adjacent turbine stage. Additionally or alternatively, in some embodiments the clamping members may be selectively rotated about the longitudinal axis of the clamping-arm extender, so that the clamping members may be appropriately oriented depending on the shapes, orientations, and contours of the turbine stages which are being engaged by the clamping members.

In some embodiments, the clamping-arm extender is configured to be selectively translated longitudinally relative to the support frame 34, so that the clamping members may be appropriately positioned relative to the turbine stages being engaged and clamped. For example, turbine stages may include surfaces that are more appropriate to be engaged and clamped than other surfaces. This functionality may be accomplished in any suitable manner, including having a relationship between the clamping arm and the support frame that is similar to the optional relationship between the drill arm and the support frame discussed herein, such as with the clamping arm having an extended position and a retracted position in which the clamping-arm extender is retracted fully from between adjacent turbine stages. However, it may not be necessary to have such an extent of longitudinal translation of a clamping-arm extender. Accordingly, in some embodiments, as schematically illustrated in FIG. 1, a clamping arm may include a clamping-arm housing 68, with the clamping-arm extender being operatively coupled to the clamping-arm housing so that it may be selectively and longitudinally translated relative to the clamping-arm housing among a plurality of longitudinal positions. To facilitate the longitudinal translation of the clamping-arm extender relative to the clamping-arm housing, a clamping arm may include a user input mechanism 70 that is configured to receive user inputs. Any suitable form of a user input mechanism may be utilized, with an input wheel being an illustrative, non-exclusive example.

In embodiments that include a clamping-arm extender that longitudinally translates relative to a clamping-arm housing, a clamping arm 32 may include a locking mechanism 71 that is configured to selectively lock, or otherwise secure, the clamping-arm extender in a desired longitudinal position relative to the clamping-arm housing. Any suitable form of input member that is associated with the optional locking mechanism and configured to receive user inputs to operate the locking mechanism is within the scope of the present disclosure.

In some embodiments, it may be desirable for a single clamping arm 32 to include more than one clamping-arm extender, such as two clamping-arm extenders that are positioned generally vertically relative to each other. This is schematically represented in FIG. 1 with a second clamping member 64 of a second clamping arm-extender illustrated in dashed lines. In embodiments that include a separate clamping-arm housing and two clamping-arm extenders, each clamping-arm extender may be operatively coupled to the clamping-arm housing with independent control of the longitudinal translation of the respective clamping-arm extender relative to the clamping-arm housing. Such a configuration may be desirable so that an operator may appropriately clamp to more than one location on the adjacent turbine stages being engaged.

Clamping arms 32 may be operatively coupled to support frame 34 for selective translation in a lateral direction relative to the support frame among a plurality of lateral positions. This relationship between clamping arm 32 and support frame 34 is schematically illustrated in FIG. 1 with the horizontal double-headed arrow positioned in the schematic representation of the two illustrated clamping arms 32. It is within the scope of the present disclosure that a clamping arm 32 is configured, or that another portion of a machine tool 10 or a drilling assembly 40 is configured, to selectively lock, or secure, the clamping arm in a desired position among its plurality of lateral positions.

In some embodiments, although not required, when two clamping arms are included in a drilling assembly, a single mechanism for laterally translating both clamping arms may be used. For example, a leadscrew mechanism for laterally translating both clamping arms may be used. The leadscrew mechanism may include first directional threads associated with one of the two clamping arms and second, opposite, directional threads associated with the other of the two clamping arms, so that when the screw is rotated in one direction, the two clamping arms laterally translate toward each other, and when the screw is rotated in the opposite direction, the two clamping arms laterally translate away from each other. It also is within the scope of the present disclosure that separate mechanisms with separate user controls may be used to laterally translate the clamping arms.

Machine tools 10 may include a user input mechanism 72 that is configured to receive user input to selectively translate a clamping arm 32 laterally relative to the support frame among its plurality of lateral positions. User input mechanism 72 is schematically illustrated in FIG. 1 as overlapping the clamping arm and the support frame, schematically representing that may be operatively coupled to the clamping arm and the support frame in a position to appropriately receive user inputs. Any suitable form of a user input mechanism may be utilized, and as an illustrative, non-exclusive example, when a leadscrew mechanism is utilized to facilitate the lateral translation of one or more clamping arms, an input wheel operatively coupled to the screw portion of the leadscrew mechanism may be provided.

Still referring to FIG. 1, and as mentioned, some machine tools 10 may include a support stand 36. When present, the support stand is configured to engage a floor surface and be positioned relative to a turbine rotor assembly for use of the machine tool. Furthermore, the support stand, when present, operatively supports drilling assembly 40 and is configured to permit a user to position the drilling assembly in a desired location. For example, in some embodiments, the support stand may suspend the drilling assembly. In such embodiments, the support stand may be described as a crane.

In FIG. 1, the support stand is schematically illustrated as overlapping support frame 34 of drilling assembly 40, schematically representing that the support stand may suspend, or be otherwise operatively coupled to, the support frame. A coupling mechanism 74 is illustrated in FIG. 1, and schematically represents that the drilling assembly may be operatively coupled to the support stand with multiple degrees of freedom relative thereto. For example, it is within the scope of the present disclosure that the support frame is configured to be selectively rotated horizontally relative to the support stand, to be selectively pivoted in one or more vertical planes relative to the support stand, to be selectively translated linearly relative to the support stand, to be selectively translated horizontally relative to the support stand, and/or to be translated vertically relative to the support stand. Such optional configurations may facilitate an operator in appropriately positioning the drilling assembly in a desired position relative to a turbine stage to be machined, and may provide for the drilling assembly to be appropriately positioned so that a tool operatively coupled to a drilling arm is appropriately aligned with the axis of a pin to the drilled, or otherwise positioned with the axis of the tool in a desired orientation relative to the turbine stage to be machined. Coupling mechanism 74 may be part of the drilling assembly, the support stand, or a combination of both of the drilling assembly and the support stand. Alternatively, coupling mechanism 74 may be a stand-alone component that operatively couples the drilling assembly to the support stand. Moreover, the coupling mechanism may include an assembly of various components that are configured to provide the desired functionality and degrees of freedom between the drilling assembly and the support stand.

In FIG. 1, a user input mechanism 78 is schematically illustrated overlapping the support frame and the support stand, schematically representing that an operator of a machine tool 10 may selectively position the drilling assembly relative to the support stand, such as by adjusting coupling mechanism 74. In particular, it may be important during appropriate positioning of the drilling assembly proximate to a turbine stage to be machined to adjust the relative positioning of the drilling assembly relative to the support stand, such as to ensure that the center of gravity of the drilling assembly is positioned in a desired location, such as directly beneath a point of suspension from the support stand. That said, the center of gravity of the drilling assembly may change as an operator adjusts such things as the longitudinal position of the drilling arm(s) and/or of the clamping-arm extender(s).

Some embodiments of support stands 36 may include a coolant collection receptacle 76 for collecting coolant or lubricant that may be applied to the interface between a turbine stage to be machined and a cutting tool. When present, the receptacle may extend fully underneath the drill arms when the drill arms are in their fully extended positions. Accordingly, any coolant or lubricant that is applied to the cutting location will drain under gravity into the receptacle.

As mentioned, and although not required in all embodiments of machine tools 10, it is within the scope of the present disclosure that a machine tool 10 may include a coolant system 38, which additionally or alternatively may be referred to as a lubricant system 38. The optional coolant system is schematically illustrated in FIG. 1 as overlapping drilling assembly 40 and the optional receptacle 76 of support stand 36, schematically representing that the coolant system may be a stand-alone component and/or may be coupled to one or more of the drilling assembly and the support stand and/or may include components of one or more of the drilling assembly and the support stand.

In FIG. 1, coolant system 38 is schematically illustrated as being directly connected to tools 44, schematically representing that coolant system 38 may include a through-coolant system. A through-coolant system, which also may be referred to as a thru-coolant system, is a coolant system that delivers coolant or lubricant under pressure directly to, and through, a cutting tool. Accordingly, in the context of machine tools 10, a drill arm 30 may be configured to selectively deliver coolant or lubricant directly to the cutting tool during operation of the machine tool, and the cutting tool may include an internal bore that is configured to receive the coolant or lubricant and deliver it directly to the interface between the cutting tool and the turbine stage to be machined. Such a configuration may be desirable to ensure that adequate coolant or lubricant is applied to the interface, for example, once the cutting tool has penetrated into the turbine stage to be machined.

Additionally or alternatively, a coolant system 38, when present, may provide for external delivery of coolant or lubricant, such as from spray nozzles or other structures that are mounted to direct coolant or lubricant at the general location of the interface between a cutting tool and a turbine stage to be machined. As an illustrative, non-exclusive example, one or more spray nozzles may be mounted on the support frame of the drilling assembly and be configured to permit an operator to selectively direct a stream or spray of coolant or lubricant from the spray nozzles. This may be described as providing a flood coolant process. Other configurations and processes also are within the scope of the present disclosure.

When optional support stand 36 includes optional coolant collection receptacle 76, the coolant system may be configured to recirculate the coolant or lubricant that is collected in the receptacle and to use it again for delivery to the interface between the cutting tool and the turbine stage being machined. In some such embodiments, the coolant system additionally may filter the recirculated coolant or lubricant to remove any particles, such as cutting chips removed from a turbine stage being machined.

Machine tools 10 may include a control system 39. In FIG. 1, the control system is schematically illustrated as overlapping drilling assembly 40, support stand 36, and coolant system 38, schematically representing that the control system may be configured to provide various functionality and control of various components and aspects of a machine tool 10. For example, the control system may control the operation of the motors associated with the drill arms. The control system may monitor such things as the extent of travel of a cutting tool. The control system may be programmable with aspects of the turbine rotor assembly, such as defining the size, location, orientation, material, and other characteristics of components of the turbine rotor assembly, with this information being used to define such things as cutting tool rotation rate, push-off rate (i.e., translation rate of a cutting tool), etc.

Additionally or alternatively, the control system may be configured to monitor characteristics of motor(s) 49 and control the motor(s) based on the monitoring. For example, the control system may monitor a current that is delivered to and/or a voltage that is applied to a motor that operates rotation of a cutting tool. Based on the monitoring, the control system may control, or alter, the current and/or the voltage. Such a configuration may be desirable to avoid the breaking of a cutting tool or the overheating of a motor. For example, because of the confined space associated with the positioning of the cutting tool relative to a turbine stage being machined, replacement of a broken cutting tool may be more difficult than is typical in other machining operations. Accordingly, when a current that is delivered to the motor exceeds a threshold current and/or when the voltage that is applied to the motor exceeds a threshold voltage, the control system may operatively reduce the power supplied to the motor. Additionally or alternatively, the control system may be configured to decrease the rotational speed of the motor and thus of the cutting tool and/or to completely cease rotation of the cutting tool and/or to reverse the rotation of the cutting tool, when the current exceeds a threshold current and/or when the voltage exceeds a threshold voltage.

Additionally or alternatively, in embodiments that include a first motor for operating the rotation of a cutting tool and a second motor for operating the translation of the drill-arm body, and thus the translation of the cutting tool laterally relative to the turbine stage being machined (i.e., in the direction of the axis of the cutting tool), the control system may be configured to monitor characteristics of the first motor and to control operation of the second motor based on the monitoring of the first motor. For example, by monitoring one or both of the current delivered to or the voltage applied to the motor operating the rotation of the cutting tool, the feed rate and direction of the drill-arm body, and thus the cutting tool, may be controlled to avoid breakage of the cutting tool or overheating of one or both motors. As an illustrative, non-exclusive example, when one of the current or the voltage reaches a threshold value, the translation of the drill-arm body may be stopped and reversed, for example, to back the cutting tool out of the hole being drilled. Additionally or alternatively, the rotation of the cutting tool by the first motor may be stopped and/or reversed. Other configurations also are within the scope of the present disclosure.

Depending on the turbine rotor assembly being machined and on the configuration of machine tool 10, it may be desirable to machine a turbine stage that does not have a directly adjacent turbine stage on both sides of the turbine stage to be machined. For example, with reference to FIG. 1, the left of the three illustrated turbine stages 16 may be described as an end-stage, because another turbine stage is not present directly to the left of the end-stage. Accordingly, if a machine tool 10 is to be used to machine an end-stage, and the machine tool 10 includes drill arm 30 and/or a clamping arm 32 that generally engages an adjacent turbine stage to the left (or right of a right end-stage) of the turbine stage to be machined, then a false stage 80 may be provided. As schematically illustrated in FIG. 1, the false stage may be securely coupled to turbine rotor shaft 14 adjacent to an end stage. Accordingly, when present, the false stage may provide the necessary structure for a drill arm 30 to push off of and/or for a clamping arm 32 to engage for clamping the clamping arm to the turbine rotor assembly. False stage 80 may take any suitable form and may be coupled to the rotor shaft utilizing any suitable mechanism, which is schematically illustrated in FIG. 1 at 82.

Having set forth characteristics of machine tools 10, including optional characteristics and components of machine tools 10, illustrative, non-exclusive examples of methods according to the present disclosure are set forth. As mentioned, the inventive methods and steps of methods disclosed herein are not required to be performed by or be associated with machine tools 10, and may be performed by or be associated with other machine tools or with variations on machine tools 10. That is, the methods and steps disclosed herein are inventive separate and apart from the specific machine tools 10 disclosed herein. Moreover, additional methods associated with machine tools 10 are within the scope of the present disclosure, even if not expressly set forth as a method.

A method for machining a turbine stage may include engaging a turbine stage that is directly adjacent to the turbine stage to be machined and pushing off of the adjacent turbine stage to translate a cutting tool toward and into contact with the turbine stage to be machined. In some such methods, the method may further include engaging both turbine stages that are directly adjacent to the turbine stage to be machined, and pushing off of both adjacent turbine stages to translate respective cutting tools toward and into contact with the turbine stage to be machined. That is, in some methods according to the present disclosure, the turbine stage to be machined may be machined from both sides.

In some such methods, prior to engaging one or both adjacent turbine stages, the machine tool may be secured to one or both of the adjacent turbine stages. Additionally or alternatively, the machine tool may be secured to the turbine stage to be machined.

In some such methods, prior to machining the turbine stage to be machined with one or more cutting tools, opposite ends of a pin associated with the turbine stage to be machined may be engaged with a pair of centering tools to appropriately align the machine tool for subsequent machining of the pin. Additionally or alternatively, opposite ends of a hole associated with a pin associated with the turbine stage to be machined may be engaged with a pair of centering tools to appropriately align the machine tool for subsequent reaming of the hole.

Additionally or alternatively, a method for machining a turbine rotor assembly, such as a turbine stage, may include securing a machine tool to a turbine stage that is directly adjacent to a turbine stage to be machined. After the securing and while the machine tool is secured to the adjacent turbine stage, the method may include machining the turbine stage to be machined.

In some such methods, the securing step may include securing the machine tool to both turbine stages that are adjacent to the turbine stage to be machined. That is, a machine tool may be secured to the turbine stages that are positioned on opposite sides of the turbine stage to be machined.

In some such methods, the securing step additionally may include securing the machine tool to the turbine stage to be machined. Accordingly, some methods may include securing the machine tool to the turbine stage to be machined and to one or both of the adjacent turbine stages.

In some such methods, prior to the securing, opposite ends of a pin, or opposite ends of a hole associated with a pin associated with the turbine stage to be machined, may be engaged by the machine tool, such as with a pair of centering tools. Then, after the securing, one or both of the centering tools may be replaced with a cutting tool for machining the turbine stage to be machined.

Additionally or alternatively, a method for drilling or reaming a hole in a turbine rotor assembly may include machining a turbine stage to be machined with a first cutting tool having a first length to define a first depth of the hole, and then machining the turbine stage to be machined with a second cutting tool having a second length that is greater than the first length to define a second depth of the hole that is greater than the first depth. This process may be continued with subsequently greater lengths of cutting tools. Accordingly, a desired depth of a hole, such as corresponding to a length of a pin associated with the turbine stage to be machined, may be achieved. This process may be referred to as step-drilling.

In some such methods, a cutting tool may be decoupled from the machine tool being used while the cutting tool is still positioned at least partially in the hole being machined. Then, the cutting tool may be replaced with a longer cutting tool by placing the longer cutting tool at least partially in the hole being machined. Then, the longer cutting tool may be operatively coupled to the machine tool for further machining of the hole to a greater depth. Again, this process may be repeated until such time that a desired depth is achieved.

Additionally or alternatively, a method for drilling or reaming a hole in a turbine rotor assembly may include machining a turbine stage to be machined with a first cutting tool having a first diameter to define a hole having the first diameter, and then machining the turbine stage to be machined with a second cutting tool having a second diameter that is greater than the first diameter to define a hole having the second diameter. This process may be continued with subsequently greater diameters of cutting tools. Accordingly, a desired diameter of a hole, such as corresponding to a diameter of a pin associated with the turbine stage to be machined, may be achieved. This process also may be referred to as step-drilling and may be implemented together with or separate from the changing of the lengths of cutting tools as discussed herein.

Additionally or alternatively, a method for machining a turbine rotor assembly with a machine tool that includes a motor for rotating a cutting tool may include monitoring one or both of the current delivered to the motor and the voltage applied to the motor. Based on the monitoring, one or both of the current and the voltage may be controlled. Additionally or alternatively, the controlling of the motor may include decreasing the rotational output of the motor, reversing the direction of the rotational output of the motor, and/or ceasing the rotational output of the motor. Such methods may find application when machining turbine rotor assemblies, because of the confined space between two adjacent turbine stages and thus because of the difficulty in removing and replacing broken cutting tools. That is, the controlling of the motor may be in an effort to avoid the breaking of a cutting tool and/or in an effort to avoid overheating of the motor.

Additionally or alternatively, a method for machining a turbine rotor assembly with a machine tool that includes a first motor for rotating a cutting tool and a second motor for translating the cutting tool (e.g., by translating an associated drill-arm body) may include monitoring one or both of the current delivered to the first motor and the voltage applied to the first motor. Based on the monitoring, the rotational output of the second motor may be controlled. For example, the controlling of the second motor may include decreasing the rotational output of the second motor, reversing the direction of the rotational output of the second motor, and/or ceasing the rotational output of the second motor. As a result, the translation of the cutting tool relative to the turbine stage being machined may be ceased and/or reversed. Such methods may find application when machining turbine rotor assemblies, because of the confined space between two adjacent turbine stages and thus because of the difficulty in removing and replacing broken cutting tools. That is, the controlling of the motor may be in an effort to avoid the breaking of a cutting tool and/or in an effort to avoid overheating of a motor.

Turning now to FIGS. 2-8, an illustrative, non-exclusive example of a machine tool 10 according to the present disclosure is illustrated and indicated generally at 100. Where appropriate, the reference numerals from the schematic illustration of FIG. 1 are used to designate corresponding parts of machine tool 100; however, the example of FIGS. 2-8 is non-exclusive and does not limit the present disclosure to the illustrated embodiment. That is, neither machine tools 10, nor portions thereof, are limited to the specific embodiment of machine tool 100 illustrated in FIGS. 2-8, and machine tools 10 may incorporate any number of the various aspects, configurations, characteristics, properties, etc. of machine tools 10 or components thereof that are illustrated in and discussed with reference to FIGS. 2-8, as well as variations thereof, without requiring the inclusion of all such aspects, configurations, characteristics, properties, etc. For the purpose of brevity, each previously discussed component, part, portion, aspect, region, etc. or variants thereof may not be discussed again with respect to machine tool 100 of FIGS. 2-8; however, it is within the scope of the present disclosure that the previously discussed features, variants, etc. may be utilized with machine tool 100.

Figure 2:
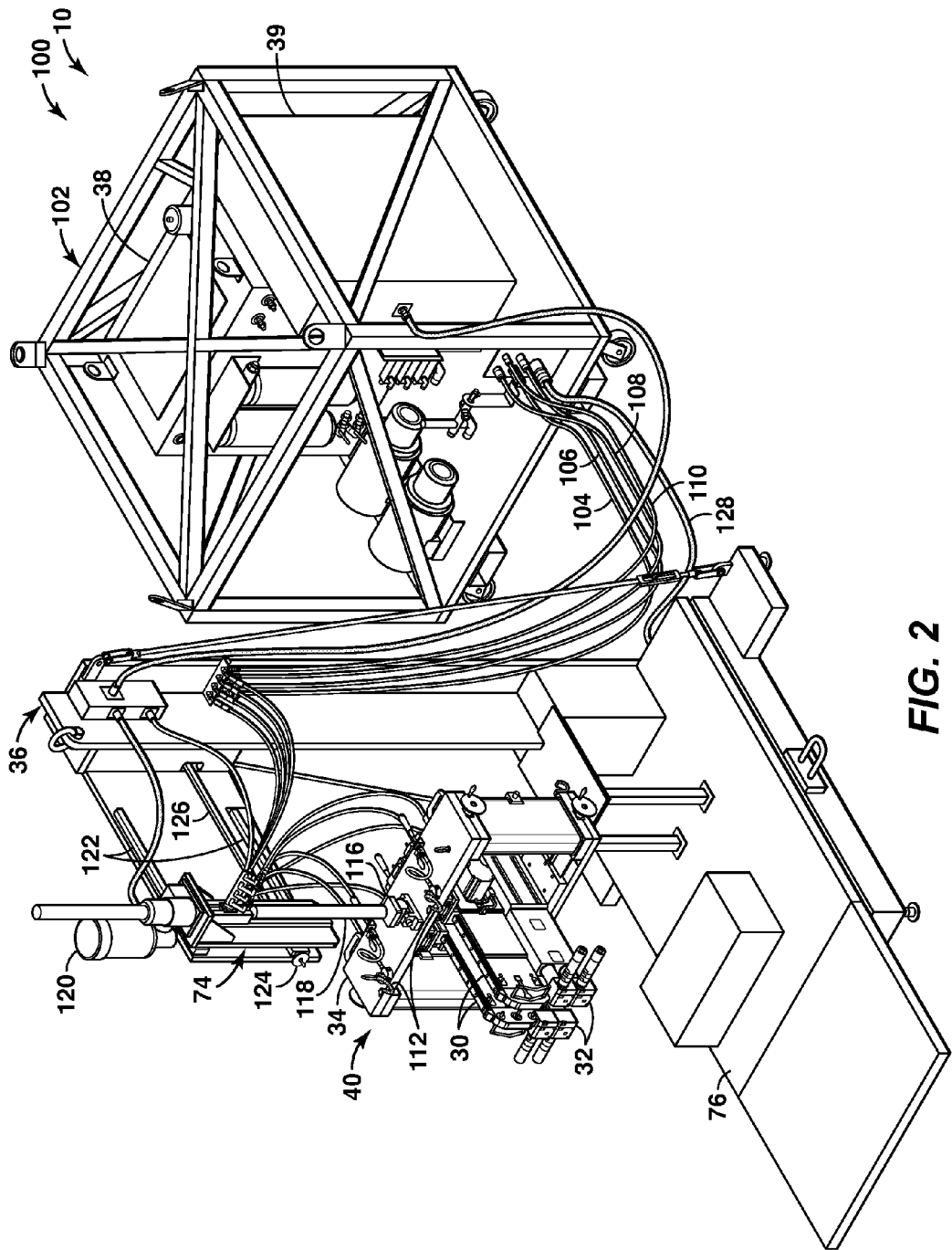
FIG. 2 is an isometric top left view of an illustrative, non-exclusive example of a machine tool according to the present disclosure.
Figure 3:
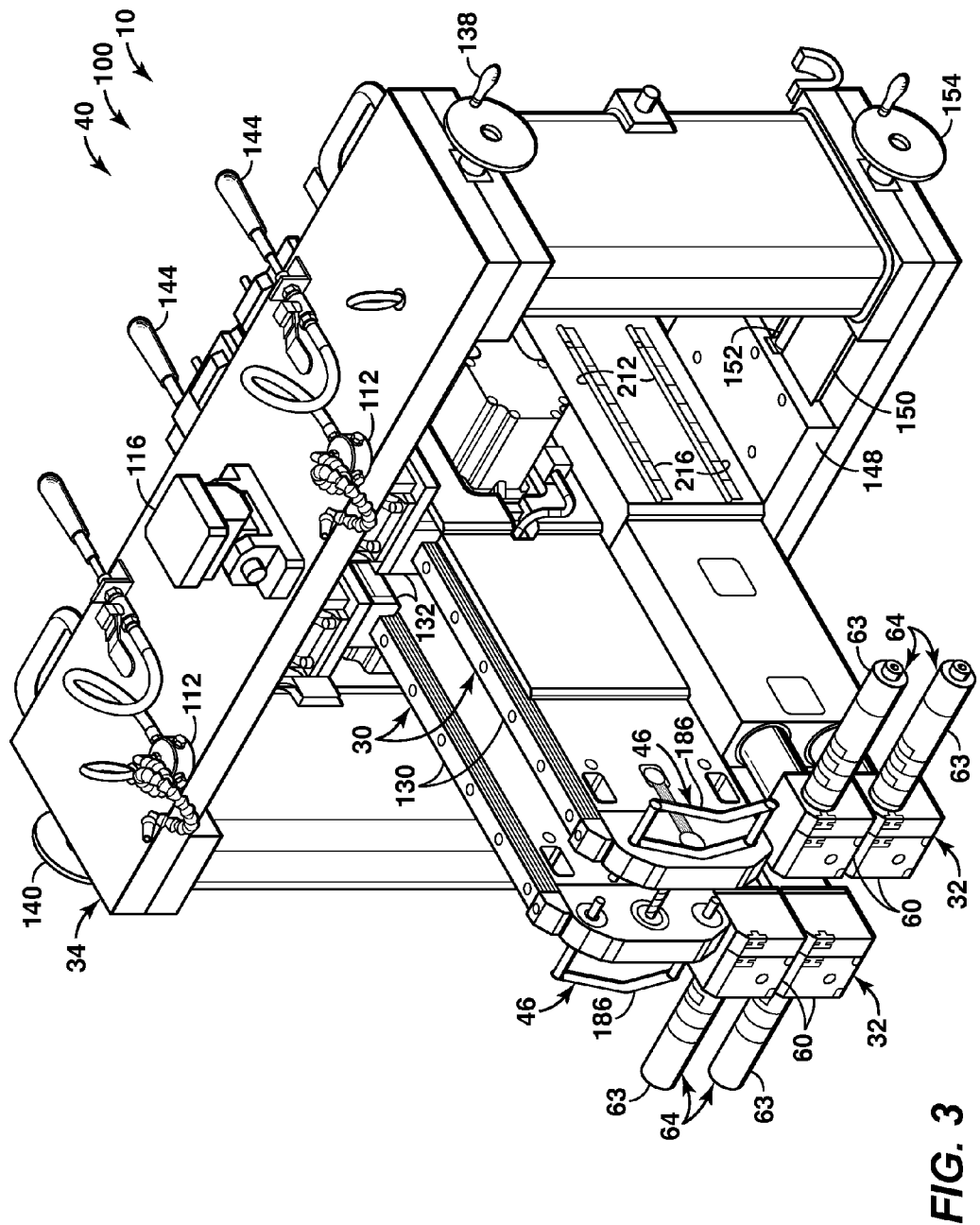
FIG. 3 is an isometric top left view of the drilling assembly of the machine tool of FIG. 2.

As seen with reference to FIG. 2, machine tool 100 is an example of a machine tool 10 that includes a drilling assembly 40 that is supported by and suspended from a support stand 36. The drilling assembly of machine tool 100 includes two drill arms 30 and two clamping arms 32.

Machine tool 100 further includes a control module 102 that houses portions of a coolant system 38 and a control system 39. As illustrated, the control module includes its own frame and wheels for positioning separate from the support stand. Such a configuration is not required, but may facilitate appropriate positioning of the various components of a machine tool 10. For example, the support stand, together with the drilling assembly, initially may be positioned by utilizing a fork lift or other lifting and moving equipment. Likewise, the control module may be initially positioned by utilizing a fork lift or other lifting and moving equipment, but depending on the environment directly surrounding a turbine rotor assembly to be machined, it may be necessary to move the control module to various positions relative to the support stand.

Coolant delivery lines 104, 106, 108, and 110 are operatively connected between the control module and the drilling assembly, with coolant delivery lines 106 and 108 being operatively connected to a pair of spray nozzles 112 mounted on the support frame of the drilling assembly, and with delivery lines 104 and 110 being operatively connected to the drill arms for providing through-coolant to cutting tools. Each of coolant delivery lines 104, 106, 108, and 110 include three sections, with a first section extending from the control module 102 to the support stand 36, a second section extending from the support stand to coupling mechanism 74, and a third section extending from the coupling mechanism to the drilling assembly. Additionally, coolant delivery lines 106 and 110 include a fourth section extending from a rear mounting bracket to spray nozzles 112.

As indicated, machine tool 100 includes a coupling mechanism 74. The coupling mechanism of machine tool 100 includes a universal joint 116 mounted to the top side of support frame 34, with the universal joint being connected to a vertical shaft 118. The shaft is operatively movable up and down by a motor 120. Additionally, the vertical shaft and motor may be translated horizontally along a track 122 in response to an operator turning an input wheel 124 operative to rotate a leadscrew mechanism 126.

The support stand of machine tool 100 includes a coolant collection receptacle 76 that extends beneath the full extent of the drill arms. Accordingly, used coolant may be collected and circulated back to the control module via a coolant recycle line 128.

Figure 4:
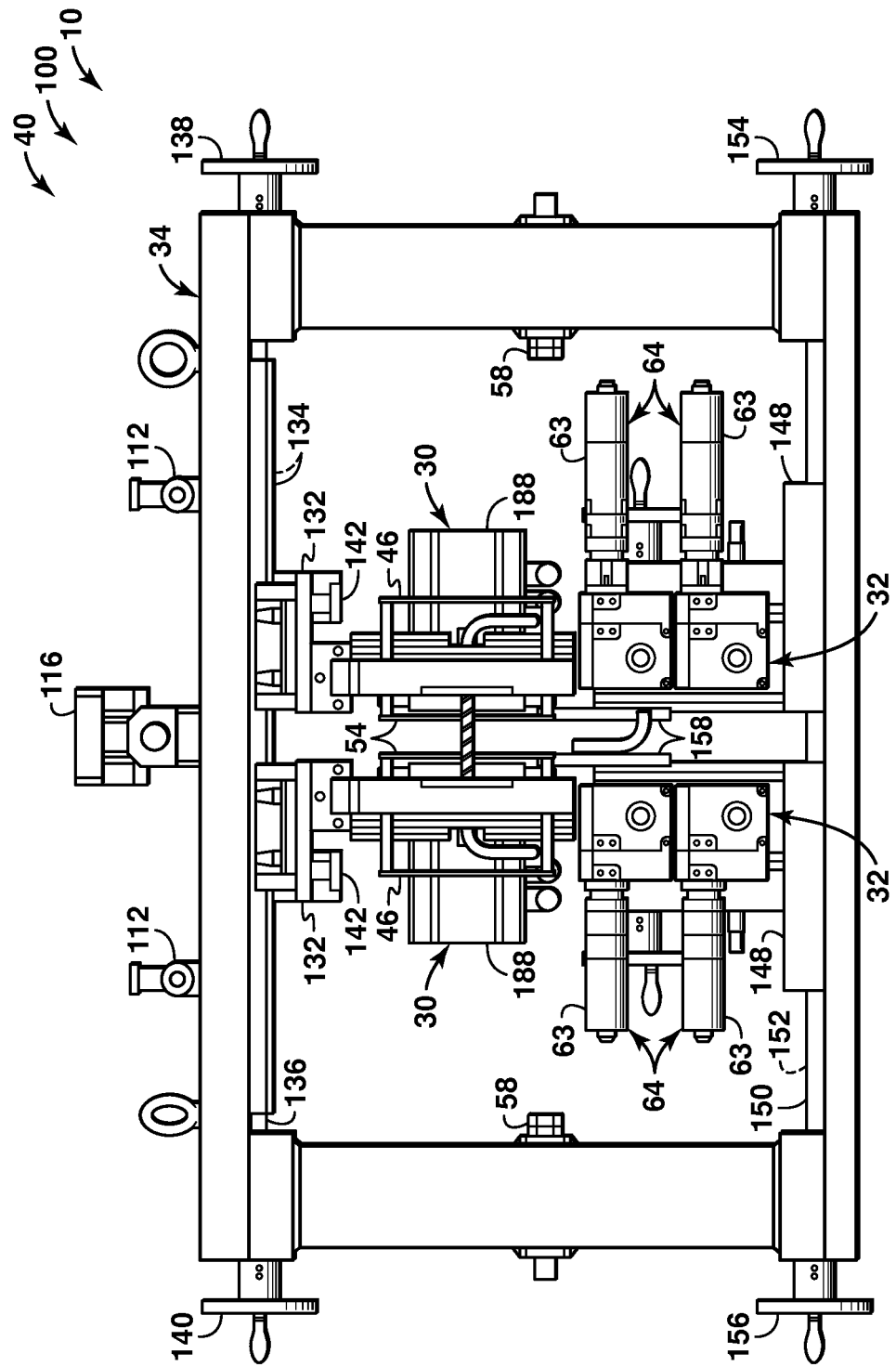
FIG. 4 is a front view of the drilling assembly of FIG. 3.
Figure 5:
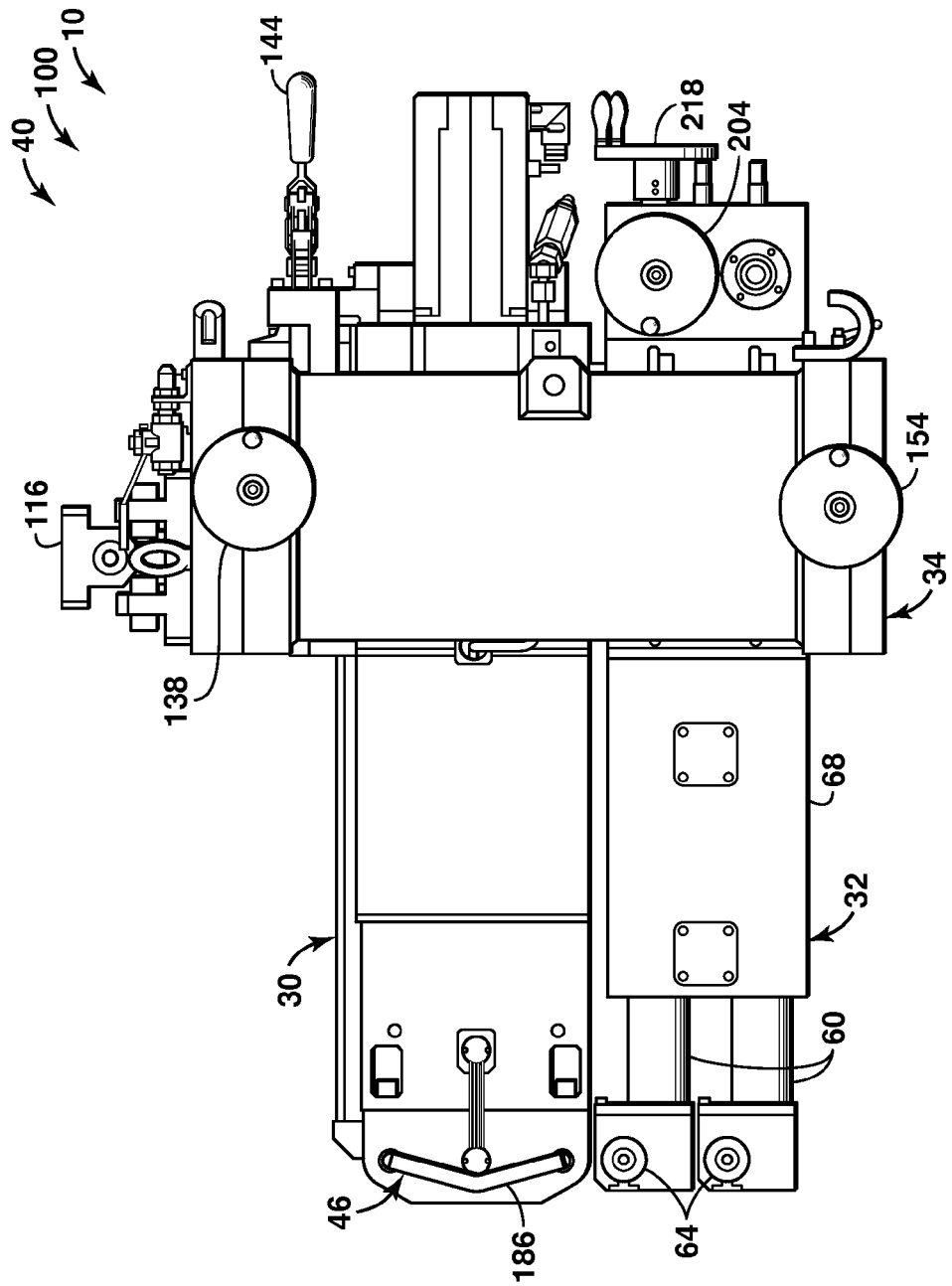
FIG. 5 is a left side view of the drilling assembly of FIG. 3.

FIGS. 3-6 provide more detailed views of the drilling assembly 40 of machine tool 100. As perhaps best seen in FIG. 3, the drill arms 30 of machine tool 100 each include a longitudinal rail 130 mounted along the top edge of the drill arm. The rail is configured to slide within corresponding carriages 132. The carriages 132 slide along a pair of rails 134 mounted to an underside of the top frame member of support frame 34, and the carriages are operatively coupled to a leadscrew mechanism 136, as indicated in FIG. 4. A left input wheel 138 is operative to selectively translate the left of the two drill arms, and a right input wheel 140 is operative to selectively translate the right of the two drill arms. Each carriage 132 includes a release mechanism 142 that is configured to disengage the respective carriage from the leadscrew mechanism. Accordingly, during operation of machine tool 100, after an operator has appropriately positioned the drill arms for machining a turbine stage, the operator may disengage the drill arms from the leadscrew mechanism so that the drill arms may translate freely in response to the push-off mechanisms engaging their respective push-off structures.

Additionally, carriages 132 each include a locking mechanism 144 that permits an operator to lock the drill arms in their extended positions. Each locking mechanism, when actuated, causes the respective drill arm to engage a precision stop defined by the respective carriage. This functionality ensures that the extended position of the drill arm is precise, each and every time an operator actuates the locking mechanism.

The clamping arms 32 of machine tool 100 are examples of clamping arms that each includes a clamping-arm housing 68 and two clamping-arm extenders 60 extending from the clamping-arm housing. In FIGS. 3-6, the clamping members 64 are illustrated with spacers, or extenders, 63 that may be selected depending on the spacing of the turbine stages of a turbine rotor assembly being machined. Within the scope of the present disclosure are various sizes, lengths, and configurations of spacers, and the present disclosure is not limited to the illustrated configurations.

Each clamping arm includes a carriage 148 that is engaged with a rail, or dovetail, 150 mounted to the upper side of the lower frame member of support frame 34. The carriages are operatively coupled to a leadscrew mechanism 152, and a left input wheel 154 permits an operator to selectively translate the left clamping arm, and a right input wheel 156 permits an operator to selectively translate the right clamping arm.

Figure 6:
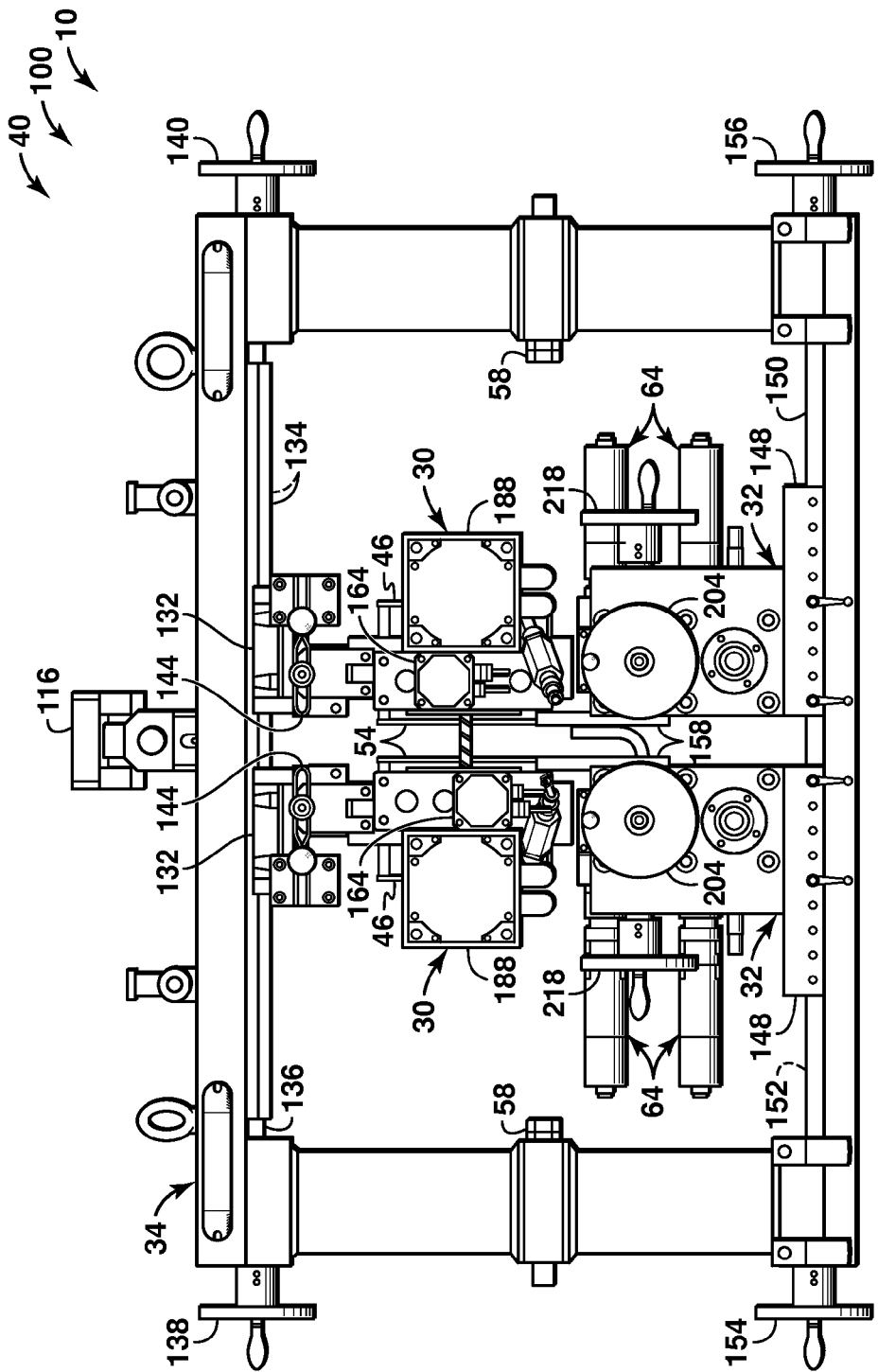
FIG. 6 is a rear view of the drilling assembly of FIG. 3.

As best seen in the rear view of FIG. 6, the clamping arms include structures 158 and the support frame includes structures 58 for being engaged by the rear push-off mechanisms 54 of the two drill arms. That is, the rear push-off mechanisms of machine tool 100 are configured to selectively engage structures 158, for example, when it is desired to translate the two drill arms away from each other, and to engage structures 58, for example when it is desired to translate the two drill arms toward each other, when the drill arms are decoupled from the leadscrew mechanism 136. Although the illustrated rear push-off mechanisms 54 are not illustrated as extending to the structures 58 with the drill arms in their illustrated positions, various extensions may be provided to permit a user to adjust the reach of the rear push-off mechanisms, for example, depending on the particular configuration of a turbine rotor assembly being machined with machine tool 100.

Figure 7:
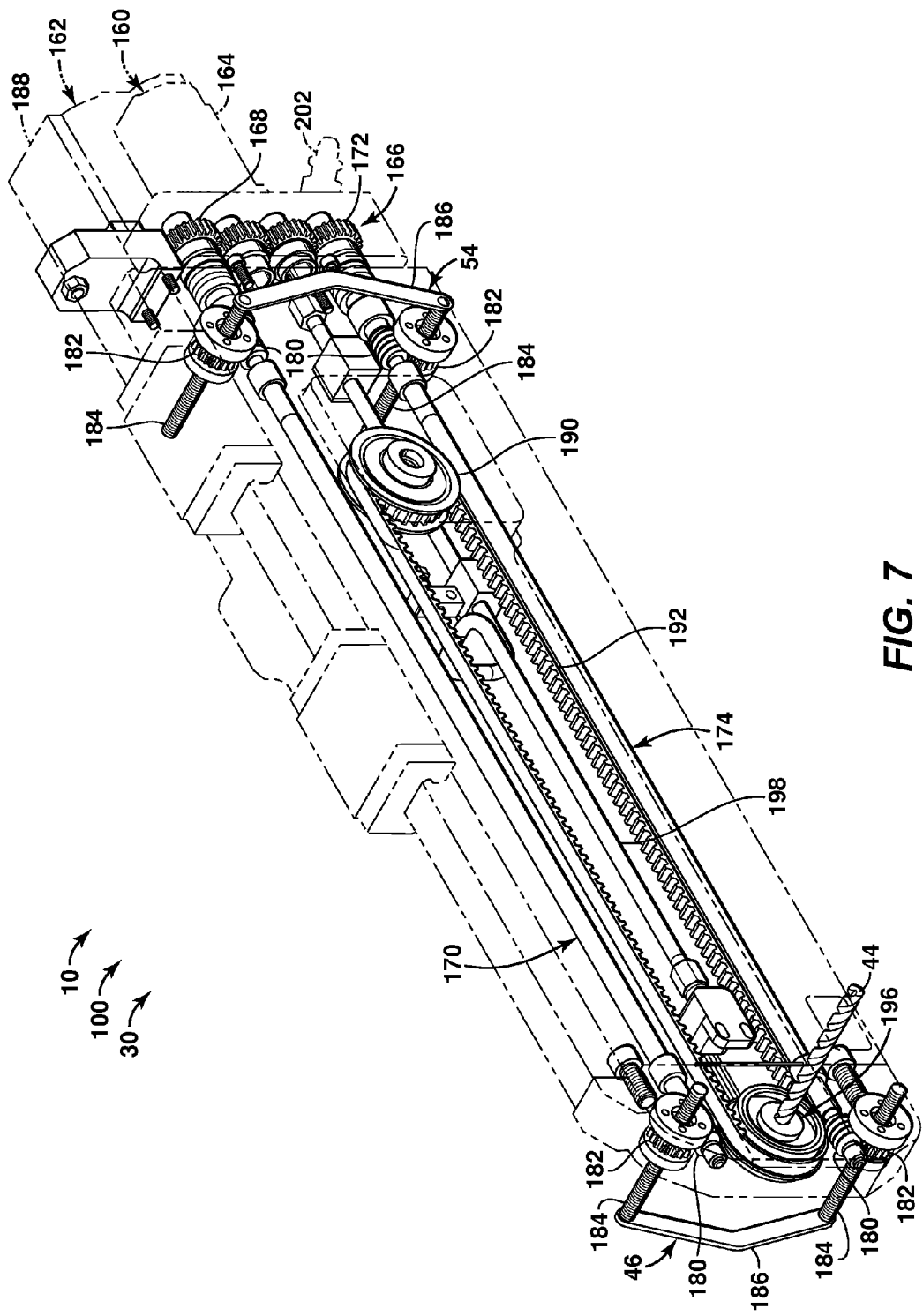
FIG. 7 is an isometric top left view of the internal mechanisms of the right-side drill arm of the drilling assembly of FIG. 3, with outer surfaces of the right-side drill arm illustrated in phantom.

Turning now to FIG. 7, a detailed view of the mechanical systems of the right drill arm 30 of machine tool 100 is presented. This discussion with respect to the right drill arm equally applies to the left drill arm, and in machine tool 100, the left drill arm generally is a mirror image of the right drill arm with the exception of the position of motor 164, as seen with reference to FIG. 6. The mechanical systems of the drill arm include two distinct systems. A first mechanical system 160 is associated with operation of the two push-off mechanisms 46, 54. A second mechanical system 162 is associated with operation of the tool 44, which in FIG. 7 is in the form of a drill bit.

System 160 includes a motor 164 that drives a set of four gears 166, with a top gear 168 operative to rotate a top shaft 170, and a bottom gear 172 operative to rotate a bottom shaft 174. Each of the shafts 170 and 174 include a worm drive associated with the rear push-off mechanism and a worm drive associated with the forward push-off mechanism, with each worm drive including a worm 180 and a worm gear 182. Worm gears 182 are internally threaded and receive an externally threaded push-shaft 184. To prevent the push-shafts from simply turning in place in response to the rotation of the worm gears, anti-rotation plates 186 operatively connect the two forward push-shafts and the two rear push-shafts. Accordingly, as motor 164 rotates in a first direction, the push-shafts will translate to the right, and as the motor rotates in the opposite direction, the push-shafts will translate in to the left. In FIG. 7, the rear anti-rotation plate is connected to the left sides of the respective push-shafts; however, an anti-rotation plate may additionally or alternatively be connected to the right sides of rear push-shafts. Moreover, it is within the scope of the present disclosure that push-shafts of various lengths may be provided and/or extensions may be added to push-shafts depending on the spacing of turbine stages of a turbine rotor assembly.

System 162 includes a motor 188 that operatively drives a drive pulley 190 via a gear box. A belt 192 operatively connects the drive pulley to a spindle pulley 194, which is configured to be operatively connected to a tool cartridge, or adapter, 196 including a tool 44.

Also illustrated in FIG. 7 and included in the drill arms of machine tool 100 is a portion of the coolant system of machine tool 100. Specifically, a coolant delivery line 198 delivers coolant from an inlet 202 to the rear side of the tool cartridge, so that a tool, such as a drill bit having one or more internal bores, may facilitate delivery of coolant or lubricant directly to the interface between the tip of the tool and the part being machined.

Figure 8:
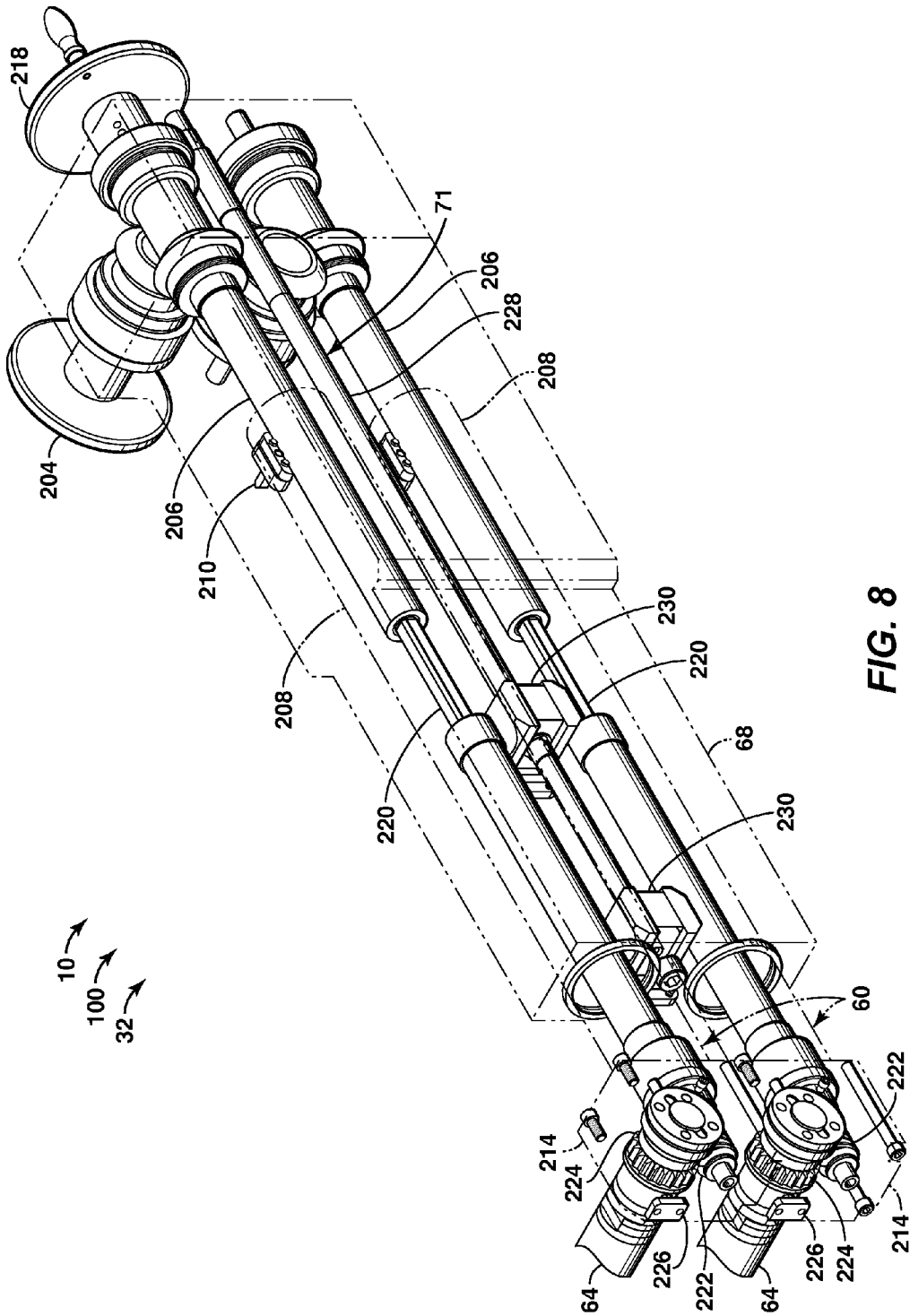
FIG. 8 is an isomeric top left view of the internal mechanisms of the right-side clamping arm of the drilling assembly of FIG. 3, with outer surfaces of the right-side clamping arm illustrated in phantom.

Turning now to FIG. 8, a detailed view of the mechanical systems of the right clamping arm 32 of machine tool 100 is presented. This discussion with respect to the right clamping arm equally applies to the left clamping arm, and in machine tool 100, the left clamping arm generally is a mirror image of the right clamping arm. As mentioned, the clamping arms of machine tool 100 are examples of clamping arms that include two clamping-arm extenders 60 extending from a clamping-arm housing 68. The mechanism that is operative to extend the upper of the two clamping-arm extenders is essentially identical to the mechanism that is operative to extend the lower of the two clamping-arm extenders. Similarly, the mechanism that is operative to translate the upper of the two clamping members 64 is essentially identical to the mechanism that is operative to translate the lower of the two clamping members. Accordingly, the upper and lower mechanisms are not discussed separately herein.

To selectively adjust the longitudinal translation of the clamping-arm extender relative to the clamping-arm housing, an operator rotates an input wheel 204, which in turn rotates a shaft 206. Shaft 206 includes external threads that are engaged with internal threads of an outer shaft 208 of clamping-arm extender 60. A key 210 is secured to the outer shaft and extends through a slot 212 in the clamping-arm housing 68, and which is illustrated and indicated in FIG. 3. This key restricts the outer shaft from rotating, so that when shaft 206 rotates, outer shaft 208 is caused to translate longitudinally relative to shaft 206. Accordingly, when an operator rotates input wheel 204, outer shaft 208, together with the housing 214 that supports the clamping mechanism, is caused to translate longitudinally relative to the clamping-arm housing. Moreover, as illustrated and indicated in FIG. 3, the clamping-arm housing may include a scale 216 along slot 212, so that an operator may position the clamping-arm extender in a desired longitudinal position with reference to where the key is positioned relative to the scale.

To selectively adjust the lateral translation of clamping member 64, such as to translate the clamping member toward and into contact with a turbine stage, an operator rotates an input wheel 218, which in turn rotates a shaft 220. Shaft 220 includes a worm 222 that is engaged with a worm gear 224. Worm gear 224 includes an externally threaded shaft, to which clamping member 64 is attached. A key 226 restricts rotation of the clamping member so that when the worm gear rotates, the clamping member 64 translates laterally relative to shaft 220.

In FIG. 8, two input wheels are illustrated, with input wheel 204 being connected to the mechanism that is configured to longitudinally translate the upper of the two clamping-arm extenders and with input wheel 218 connected to the mechanism that is configured to translate the upper of the two clamping members laterally relative to the clamping-arm extender. The input wheels are configured to be selectively detached from these mechanisms and coupled to the mechanisms that operate the lower of the two clamping-arm extenders and the lower of the two clamping members. It also is within the scope of the present disclosure that four input wheels be provided, and therefore not requiring removal and reattachment to selectively operate a desired mechanism.

Clamping arm 32 of machine tool 100 is an example of a clamping arm that includes a locking mechanism 71. The locking mechanism of machine tool 100 includes an input shaft 228 that when rotated, causes two pairs of wedges 230 to engage outer shafts 208 and thereby restrict the clamping-arm extenders from translating relative to the clamping-arm housing. To operate the locking mechanism, a user attaches input wheel 218 to input shaft 228 and rotates the shaft; however, it is within the scope of the present disclosure that a separate input wheel for the locking mechanism be provided.

Figure 9:
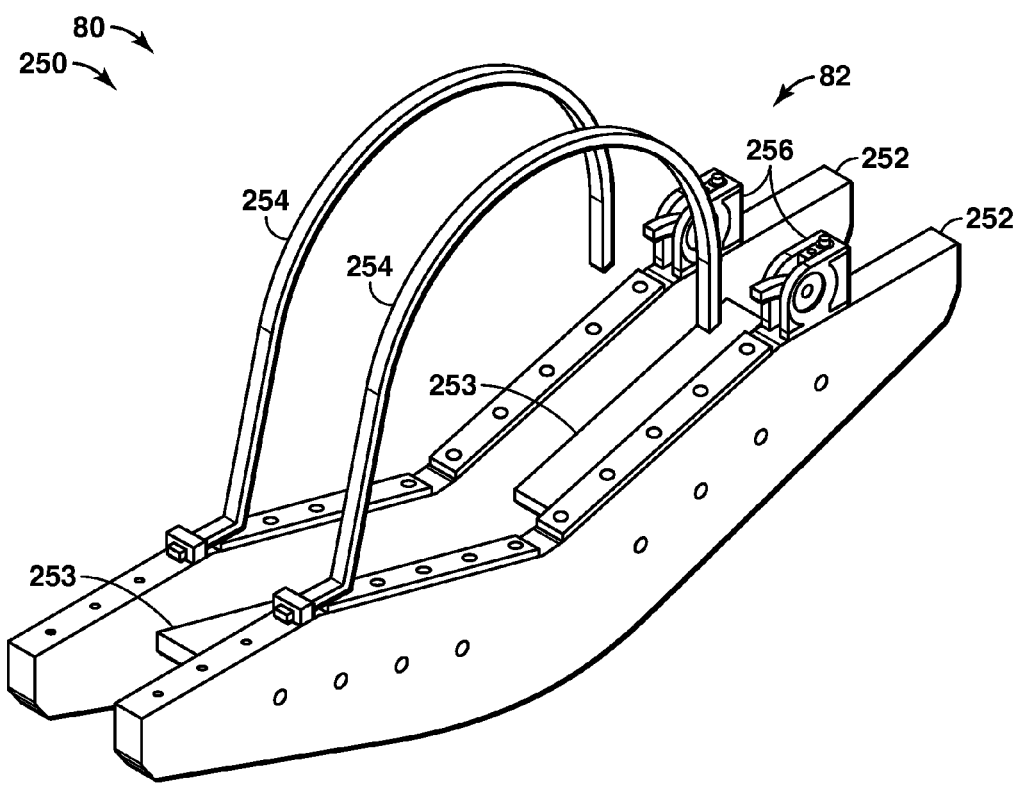
FIG. 9 is an isometric top left view of an illustrative, non-exclusive example of a false stage according to the present disclosure.

Turning to FIG. 9, an illustrative, non-exclusive example of a false stage 80 according to the present disclosure is illustrated and indicated generally at 250. False stage 250 may be used with any machine tool 10 and is not limited to being used with a machine tool 100. False stage 250 includes a pair of spaced-apart side plates 252, a pair of spacer plates 253, a pair of shaft straps 254 that are operatively coupled to the side plates, and a pair of corresponding clamping members 256 that are configured to selectively receive and secure the shaft straps. Accordingly, the shaft straps may be positioned around a turbine rotor shaft so that the side plates and the shaft straps engage the rotor shaft, and then the straps may be secured with the clamping members. When installed, the false stage provides the necessary structure for a drill arm 30 to push off of and for a clamping arm 32 to engage for clamping the clamping arm to the turbine rotor assembly for machining of an end-stage.

Illustrative, non-exclusive examples of inventions according to the present disclosure, including machine tools and methods, are described in the following enumerated paragraphs.

A A machine tool for machining a turbine rotor assembly, wherein the turbine rotor assembly includes a plurality of turbine stages, wherein each turbine stage is defined by a turbine wheel and a plurality of turbine blades extending from the turbine wheel, wherein each turbine blade is coupled to a respective turbine wheel by one or more pins, and wherein the plurality of turbine stages includes a first turbine stage to be machined, a second turbine stage that is adjacent to the first turbine stage, and a third turbine stage that is adjacent to the first turbine stage and opposite the second turbine stage, the machine tool comprising:

a drill arm configured to be positioned to at least partially extend between the first turbine stage and the second turbine stage, wherein the drill arm includes a cutting tool, and wherein the drill arm is configured to selectively translate the cutting tool toward and into engagement with the first turbine stage by engaging and pushing-off the second turbine stage during operation of the machine tool.

A1 The machine tool of paragraph A,
wherein the cutting tool is removably coupled to the drill arm; and
wherein the machine tool further comprises:
a centering tool that is configured to be selectively coupled to the drill arm and to engage and mate with a centering hole of a pin of the one or more pins when the centering tool is operatively coupled to the drill arm and during operation of the machine tool.

A2 The machine tool of any of paragraphs A-A1, wherein the cutting tool includes a reaming tool that is configured to ream a hole associated with a pin of the one or more pins.

A3 The machine tool of any of paragraphs A-A1, wherein the cutting tool includes a drilling tool that is configured to drill a pin of the one or more pins.

A4 The machine tool of any of paragraphs A-A3, wherein the drill arm is configured to selectively deliver coolant to the cutting tool during operation of the machine tool.

A4.1 The machine tool of paragraph A4, wherein the cutting tool includes an internal bore configured to receive the coolant and deliver the coolant to an interface between the cutting tool and the first turbine stage during operation of the machine tool.

A5 The machine tool of any of paragraphs A-A4.1, further comprising:
a support frame;
wherein the drill arm is operatively coupled to the support frame and includes:
a drill-arm body configured (and/or sized and/or shaped) to be positioned to at least partially extend between the first turbine stage and the second turbine stage, wherein the cutting tool is operatively coupled to the drill-arm body; and
a second-stage push-off-mechanism having a second-stage engagement-surface, wherein the second-stage push-off-mechanism is operatively coupled to the drill-arm body and is configured to selectively translate the second-stage engagement-surface away from the drill-arm body and toward the second turbine stage for engaging the second turbine stage and thus for selectively translating the drill-arm body toward the first turbine stage and the cutting tool into engagement with the first turbine stage when the drill-arm body is positioned to extend between the first turbine stage and the second turbine stage and during operation of the machine tool.

A5.1 The machine tool of paragraph A5, wherein the drill-arm body is configured to be selectively translated longitudinally relative to the support frame among a plurality of longitudinal positions including an extended position and a retracted position, wherein the cutting tool is further away from the support frame when the drill-arm body is in the extended position than when the drill-arm body is in the retracted position.

A5.2 The machine tool of any of paragraphs A5-A5.1, wherein the drill-arm body is configured to be selectively translated laterally relative to the support frame among a plurality of lateral positions.

A5.2.1 The machine tool of paragraph A5.2, wherein the machine tool is configured so that during operation of the machine tool and when the second-stage push-off-mechanism engages the second turbine stage and translates the drill-arm body toward the first turbine stage, the drill-arm body is translated laterally relative to the support frame.

A5.2.2 The machine tool of any of paragraphs A5.2-A5.2.1, further comprising:
a lateral drill-arm input-mechanism operatively coupled to the drill arm and the support frame, wherein the lateral drill-arm input-mechanism is configured to receive user inputs to selectively translate the drill-arm body laterally relative to the support frame among its plurality of lateral positions.

A5.3 The machine tool of any of paragraphs A5-A5.2.2, wherein the drill arm is configured so that the cutting tool does not translate laterally relative to the drill-arm body during operation of the machine tool.

A5.4 The machine tool of any of paragraphs A5-A5.3, wherein the drill arm further includes:
a support-frame push-off-mechanism having a support-frame engagement-surface, wherein the support-frame push-off-mechanism is operatively coupled to the drill-arm body and is configured to translate the support-frame engagement-surface away from the drill-arm body for selectively engaging the support frame and thus for selectively translating the drill-arm-body toward the first turbine stage and the cutting tool into engagement with the first turbine stage during operation of the machine tool.

A5.5 The machine tool of any of paragraphs A5-A5.4,
wherein the drill arm is a first drill arm and the drill-arm body is a first drill-arm body; and
wherein the machine tool further comprises:
a second drill arm operatively coupled to the support frame, wherein the second drill arm includes:
a first-stage engagement-tool;
a second-drill-arm body configured (and/or sized and/or shaped) to extend at least partially between the first turbine stage and the third turbine stage, wherein the first-stage engagement-tool is operatively coupled to the second-drill-arm body; and
a third-stage push-off-mechanism having a third-stage engagement-surface, wherein the third-stage push-off mechanism is operatively coupled to the second-drill-arm body and configured to selectively translate the third-stage engagement-surface away from the second-drill-arm body and toward the third turbine stage for engaging the third turbine stage and thus for selectively translating the second-drill-arm body toward the first turbine stage and the first-stage engagement-tool into engagement with the first turbine stage during operation of the machine tool.

A5.5.1 The machine tool of paragraph A5.5, wherein the second-drill-arm body is configured to be selectively translated longitudinally relative to the support frame among a plurality of longitudinal positions including an extended position and a retracted position, wherein the first-stage engagement-tool is further away from the support frame when the second-drill-arm body is in the extended position than when the second-drill-arm body is in the retracted position.

A5.5.2 The machine tool of any of paragraphs A5.5-A5.5.1, wherein the second-drill-arm body is configured to be selectively translated laterally relative to the support frame among a plurality of lateral positions.

A5.5.2.1 The machine tool of paragraph A5.5.2, wherein the machine tool is configured so that during operation of the machine tool, when the third-stage push-off-mechanism engages the third turbine stage and translates the second-drill-arm body toward the first turbine stage, the second-drill-arm body is translated laterally relative to the support frame.

A5.5.2.2 The machine tool of any of paragraphs A5.5.2-A5.5.2.1, further comprising: a lateral second-drill-arm input-mechanism operatively coupled to the second drill arm and the support frame, wherein the lateral second-drill-arm input-mechanism is configured to receive user inputs to selectively translate the second drill arm laterally relative to the support frame among its plurality of lateral positions.

A5.5.2.2.1 The machine tool of paragraph A5.5.2.2 when depending from paragraph A5.2.2, wherein the lateral second-drill-arm input-mechanism includes the lateral drill-arm input-mechanism.

A5.5.3 The machine tool of any of paragraphs A5.5-A5.5.2.2.1, wherein the second drill arm is configured so that the first-stage engagement-tool does not translate laterally relative to the second-drill-arm body during operation of the machine tool.

A6 The machine tool of any of paragraphs A-A5.5.3, further comprising:

the subject matter of any of paragraphs B-B5.

A7 The machine tool of any of paragraphs A5-A6 when depending from paragraph A5, further comprising:

a support stand configured to engage a floor surface and be positioned relative to the turbine rotor assembly for use of the machine tool, wherein the support stand operatively supports the support frame and is configured to permit a user to position the support frame in a desired location.

A7.1 The machine tool of paragraph A7, wherein the support frame is suspended from the support stand.

A7.2 The machine tool of any of paragraphs A7-A7.1, wherein the support frame is configured to be selectively rotated horizontally relative to the support stand.

A7.3 The machine tool of any of paragraphs A7-A7.2, wherein the support frame is configured to be selectively pivoted in one or more vertical planes relative to the support stand.

A7.4 The machine tool of any of paragraphs A7-A7.3, further comprising:

a universal joint operatively coupling the support frame to the support stand.

A7.5 The machine tool of any of paragraphs A7-A7.4, wherein the support frame is configured to be selectively translated linearly relative to the support stand.

A7.6 The machine tool of any of paragraphs A7-A7.5, wherein the support frame is configured to be translated horizontally relative to the support stand.

A7.7 The machine tool of any of paragraphs A7-A7.6, wherein the support frame is configured to be translated vertically relative to the support stand.

A7.8 The machine tool of any of paragraphs A7-A7.7, wherein the support stand includes a coolant collection receptacle positioned and configured to collect coolant being applied to an interface between the first turbine stage and the cutting tool during operation of the machine tool.

A8 The machine tool of any of paragraphs A-A7.8, further comprising:

a coolant system configured to supply coolant to an interface between the first turbine stage and the cutting tool during operation of the machine tool.

A8.1 The machine tool of paragraph A8 when depending from paragraph A5.5, wherein the coolant system is further configured to supply coolant to an interface between the first turbine stage and the first-stage engagement-tool during operation of the machine tool.

A9 The machine tool of any of paragraphs A-A8.1, further comprising:

a first motor operatively coupled to the drill arm and configured to operatively rotate the cutting tool;

a second motor operatively coupled to the drill arm and configured to operatively translate the drill arm relative to the first turbine stage; and a control system configured to monitor at least one of a current delivered to the first motor and a voltage applied to the first motor and based thereon to control the second motor.

A9.1 The machine tool of paragraph A9, wherein the control system is configured to monitor the current delivered to the first motor and to decrease power delivered to the second motor when the current exceeds a threshold current.

A9.2 The machine tool of any of paragraphs A9-A9.1, wherein the control system is configured to monitor the current delivered to the first motor and to decrease a rotational speed of the second motor when the current exceeds a threshold current.

A9.3 The machine tool of any of paragraphs A9-A9.2, wherein the control system is configured to monitor the current delivered to the first motor and to cease operation of the second motor when the current exceeds a threshold current.

A9.4 The machine tool of any of paragraphs A9-A9.3, wherein the control system is configured to monitor the current delivered to the first motor and to cease and then reverse the rotational direction of the second motor when the current exceeds a threshold current, thereby reversing the translation of the drill arm from toward the first turbine stage to away from the first turbine stage.

A9.5 The machine tool of any of paragraphs A9-A9.4 when depending from paragraph A5.5, further comprising:

a third motor operatively coupled to the second drill arm and configured to operatively rotate the first-stage engagement-tool; and a fourth motor operatively coupled to the second drill arm and configured to operatively translate the second drill arm body relative to the first turbine stage;

wherein the control system is further configured to monitor at least one of a current delivered to the third motor and a voltage applied to the third motor and based thereon to control the fourth motor.

A10 A machine tool for machining a turbine rotor assembly, wherein the turbine rotor assembly includes a plurality of turbine stages, wherein each turbine stage is defined by a turbine wheel and a plurality of turbine blades extending from the turbine wheel, wherein each turbine blade is coupled to a respective turbine wheel by one or more pins, and wherein the plurality of turbine stages includes a first turbine stage to be machined, a second turbine stage that is adjacent to the first turbine stage, and a third turbine stage that is adjacent to the first turbine stage and opposite the second turbine stage, the machine tool comprising:

a cutting tool; and means for engaging and pushing off from the second turbine stage to translate the cutting tool toward and into contact with the first turbine stage.

A11 A method for machining a turbine rotor assembly, the method utilizing the machine tool of any of paragraphs A-A10.

A12 The use of the machine tool of any of paragraphs A-A10.

B A machine tool for machining a turbine rotor assembly, wherein the turbine rotor assembly includes a plurality of turbine stages, wherein each turbine stage is defined by a turbine wheel and a plurality of turbine blades extending from the turbine wheel, wherein each turbine blade is coupled to a respective turbine wheel by one or more pins, and wherein the plurality of turbine stages includes a first turbine stage to be machined, a second turbine stage that is adjacent to the first turbine stage, and a third turbine stage that is adjacent to the first turbine stage and opposite the second turbine stage, the machine tool comprising:

a clamping arm configured to be positioned to at least partially extend between the first turbine stage and the second turbine stage, and wherein the clamping arm is further configured to selectively engage the first turbine stage and the second turbine stage to secure the machine tool in place for machining the first turbine stage during operation of the machine tool.

B1 The machine tool of paragraph B, wherein during operation of the machine tool, the engagement between the clamping arm and the first turbine stage and the second turbine stage creates a foundation that permits precision machining of the first turbine stage.

B2 The machine tool of any of paragraphs B-B1,
wherein the clamping arm includes:
at least one clamping-arm extender configured (and/or sized and/or shaped) to be positioned to extend between the first turbine stage and the second turbine stage;
a first-stage clamping-member operatively coupled to the clamping-arm extender and configured to be positioned to engage the first turbine stage when the clamping-arm extender is positioned to extend between the first turbine stage and the second turbine stage; and
a second-stage clamping-member operatively coupled to the clamping-arm extender and configured to be positioned to engage the second turbine stage when the clamping-arm extender is positioned to extend between the first turbine stage and the second turbine stage;
wherein at least one of the first-stage clamping-member and the second-stage clamping-member is configured to be selectively translated laterally relative to the clamping-arm extender so that the first-stage clamping-member securely engages the first turbine stage and the second-stage clamping-member securely engages the second turbine stage, when the clamping-arm extender is positioned to extend between the first turbine stage and the second turbine stage and during operation of the machine tool.

B2.1 The machine tool of paragraph B2,
wherein the clamping arm further includes a clamping-member input-mechanism configured to receive user inputs to selectively translate at least one of the first-stage clamping-member and the second-stage clamping-member laterally relative to the clamping-arm extender.

B2.2 The machine tool of any of paragraphs B2-B2.1,
wherein the clamping arm further includes a clamping-arm housing; and
wherein the clamping-arm extender is operatively coupled to the clamping-arm housing and is configured to be selectively and longitudinally translated relative to the clamping-arm housing among a plurality of longitudinal positions.

B2.2.1 The machine tool of paragraph B2.2,
wherein the clamping arm includes a clamping-arm-extender input-mechanism operatively coupled to the clamping-arm extender and the clamping-arm housing, wherein the clamping-arm-extender input-mechanism is configured to receive user inputs to selectively translate the clamping-arm extender longitudinally relative to the clamping-arm housing.

B2.3 The machine tool of any of paragraphs B2-B2.2.1,
wherein the at least one clamping-arm extender includes two clamping-arm extenders.

B3 The machine tool of any of paragraphs B-B2.3,
wherein the clamping arm is a first clamping arm; and
wherein the machine tool further comprises:
a second clamping arm configured to be positioned to at least partially extend between the first turbine stage and the third turbine stage, and wherein the second clamping arm is further configured to selectively engage the first turbine stage and the third turbine stage to secure the machine tool in place for machining the first turbine stage during operation of the machine tool.

B3.1 The machine tool of paragraph B3, wherein during operation of the machine tool, the engagement between the second clamping arm and the first turbine stage and the third turbine stage creates a foundation that permits precision machining of the first turbine stage.

B3.2 The machine tool of any of paragraphs B3-B3.1,
wherein the second clamping arm includes:
at least one second-clamping-arm extender configured (and/or sized and/or shaped) to be positioned to extend between the first turbine stage and the third turbine stage;
a first-stage clamping-member operatively coupled to the second-clamping-arm extender and configured to be positioned to engage the first turbine stage when the second-clamping-arm extender is positioned to extend between the first turbine stage and the third turbine stage; and
a third-stage clamping-member operatively coupled to the second-clamping-arm extender and configured to be positioned to engage the third turbine stage when the clamping-arm extender is positioned to extend between the first turbine stage and the third turbine stage;
wherein at least one of the first-stage clamping-member and the third-stage clamping-member of the second clamping arm is configured to be selectively translated laterally relative to the second-clamping-arm extender so that the first-stage clamping-member securely engages the first turbine stage and the third-stage clamping-member securely engages the third turbine stage, when the second-clamping-arm extender is positioned to extend between the first turbine stage and the third turbine stage and during operation of the machine tool.

B3.2.1 The machine tool of paragraph B3.2,
wherein the second clamping arm further includes a clamping-member input-mechanism configured to receive user inputs to selectively translate at least one of the first-stage clamping-member and the third-stage clamping-member laterally relative to the second-clamping-arm extender.

B3.2.2 The machine tool of any of paragraphs B3.2-B3.2.1,
wherein the second clamping arm further includes a second-clamping-arm housing; and
wherein the second-clamping-arm extender is operatively coupled to the second-clamping-arm housing and is configured to be selectively and longitudinally translated relative to the second-clamping-arm housing among a plurality of longitudinal positions.

B3.2.2.1 The machine tool of paragraph B3.2.2, wherein the second clamping arm includes a second-clamping-arm-extender input-mechanism operatively coupled to the second-clamping-arm extender and the second-clamping-arm housing, wherein the second-clamping-arm-extender input-mechanism is configured to receive user inputs to selectively translate the second-clamping-arm extender longitudinally relative to the second-clamping-arm housing.

B3.2.3 The machine tool of any of paragraphs B3.2-B3.2.2.1, wherein the at least one second-clamping-arm extender includes two second-clamping-arm extenders.

B4 The machine tool of any of paragraphs B-B3.2.3, further comprising:

a support frame;

wherein the clamping arm is operatively coupled to the support frame and is configured to be selectively translated laterally relative to the support frame among a plurality of lateral positions.

B4.1 The machine tool of paragraph B4, further comprising:

a lateral clamping-arm input-mechanism operatively coupled to the clamping arm and the support frame, wherein the lateral clamping-arm input-mechanism is configured to receive user inputs to selectively translate the clamping arm laterally relative to the support frame among its plurality of lateral positions.

B4.2 The machine tool of any of paragraphs B4-B4.1 when depending from B3, wherein the second clamping arm is operatively coupled to the support frame and is configured to be selectively translated laterally relative to the support frame among a plurality of lateral positions.

B4.2.1 The machine tool of paragraph B4.2, further comprising:

a lateral second-clamping-arm input-mechanism operatively coupled to the clamping arm and the support frame, wherein the lateral second-clamping-arm input-mechanism is configured to receive user inputs to selectively translate the second clamping arm laterally relative to the support frame among its plurality of lateral positions.

B4.2.1.1 The machine tool of paragraph B4.2.1 when depending from paragraph B4.1, wherein the lateral second-clamping-arm input-mechanism includes the lateral clamping-arm input-mechanism.

B5 The machine tool of any of paragraphs B-B4.2.1.1, further comprising:

the subject matter of any of paragraphs A-A10

B6 A machine tool for machining a turbine rotor assembly, wherein the turbine rotor assembly includes a plurality of turbine stages, wherein each turbine stage is defined by a turbine wheel and a plurality of turbine blades extending from the turbine wheel, wherein each turbine blade is coupled to a respective turbine wheel by one or more pins, and wherein the plurality of turbine stages includes a first turbine stage to be machined, a second turbine stage that is adjacent to the first turbine stage, and a third turbine stage that is adjacent to the first turbine stage and opposite the second turbine stage, the machine tool comprising:

a cutting tool; and means for securing the machine tool to the first turbine stage and the second turbine stage; and means for positioning the cutting tool in a desired position relative to the first turbine stage.

B7 A method for machining a turbine rotor assembly, the method utilizing the machine tool of any of paragraphs B-B6.

B8 The use of the machine tool of any of paragraphs B-B7.

C A method for drilling or reaming a hole in a turbine rotor assembly with a machine tool having a drill arm, wherein the turbine rotor assembly includes a plurality of turbine stages, wherein each turbine stage is defined by a turbine wheel and a plurality of turbine blades extending from the turbine wheel, wherein each turbine blade is coupled to a respective turbine wheel by one or more pins, and wherein the plurality of turbine stages includes a first turbine stage to be machined, a second turbine stage that is adjacent to the first turbine stage, and a third turbine stage that is adjacent to the first turbine stage and opposite the second turbine stage, the method comprising:

machining the first turbine stage with a first cutting tool having a first tool length and a first tool diameter to define a first depth and first hole diameter of the hole; and after machining the first turbine stage with the first cutting tool, machining the first turbine stage with a second cutting tool, wherein the second cutting tool has a second tool length that is greater that the first tool length and/or a second tool diameter that is greater than the first tool diameter to define a second depth and/or second hole diameter of the hole, wherein the second depth is greater than the first depth and the second hole diameter is greater than the first hole diameter.

C1 The method of paragraph C, further comprising:

prior to machining the first turbine stage with the first cutting tool, operatively coupling the first cutting tool to the drill arm;

after machining the first turbine stage with the first cutting tool and prior to machining the first turbine stage with the second cutting tool, decoupling the first cutting tool from the drill arm;

after decoupling the first cutting tool from the machine tool and prior to machining the first turbine stage with the second cutting tool, positioning the second cutting tool at least partially in the hole; and after positioning the second cutting tool at least partially in the hole and while the second cutting tool is positioned at least partially in the hole, operatively coupling the second cutting tool to the drill arm.

C2 The method of any of paragraphs C-C1, further comprising:

after machining the first turbine stage with the second cutting tool, machining the first turbine stage with a third cutting tool, wherein the third cutting tool has a third tool length that is greater than the second tool length and/or a third tool diameter that is greater than the second tool diameter to define a third depth and/or third hole diameter of the hole, wherein the third depth is greater than the second depth and the third hole diameter is greater than the second hole diameter.

C2.1 The method of paragraph C2 when depending from paragraph C1, further comprising:

after machining the first turbine stage with the second cutting tool and prior to machining the first turbine stage with the third cutting tool, decoupling the second cutting tool from the drill arm;

after decoupling the second cutting tool from the machine tool and prior to machining the first turbine stage with the third cutting tool, positioning the third cutting tool at least partially in the hole; and after positioning the third cutting tool at least partially in the hole and while the third cutting tool is positioned at least partially in the hole, operatively coupling the third cutting tool to the drill arm.

C3 The method of any of paragraphs C-C2.1, wherein the machining includes machining a pin of the one or more pins.

C4 The method of any of paragraphs C-C2.1, wherein the machining includes reaming a hole associated with a pin of the one or more pins.

C5 The method of any of paragraphs C-C4, wherein the method is performed utilizing the machine tool of any of paragraphs A-B5.

C6 The method of any of paragraphs C-C5, further comprising the method of any of paragraphs D-F4.

D A method for controlling the rotational output of a second motor associated with a machine tool, the method comprising:

monitoring at least one of a current delivered to a first motor and a voltage applied to the first motor; and based on the monitoring, controlling the second motor.

D1 The method of paragraph D, wherein the monitoring includes monitoring the current.

D2 The method of any of paragraphs D-D1, wherein the controlling includes decreasing the rotational output of the second motor.

D2.1 The method of paragraph D2, wherein the decreasing the rotational output of the second motor includes ceasing the rotational output of the second motor.

D3 The method of any of paragraphs D-D2.1, wherein the controlling includes reversing the rotational output of the second motor.

D4 The method of any of paragraphs D-D3, wherein the first motor is configured to rotate a cutting tool, and the second motor is configured to operatively translate the cutting tool relative to a work piece.

D5 The method of any of paragraphs D-D4, wherein the method is performed utilizing the machine tool of any of paragraphs A-B5.

D6 The method of any of paragraphs D-D5, further comprising the method of any of paragraphs C-C6 and E-F4.

E A method for machining a turbine rotor assembly with a machine tool, wherein the turbine rotor assembly includes a plurality of turbine stages, wherein each turbine stage is defined by a turbine wheel and a plurality of turbine blades extending from the turbine wheel, wherein each turbine blade is coupled to a respective turbine wheel by one or more pins, and wherein the plurality of turbine stages includes a first turbine stage to be machined, a second turbine stage that is adjacent to the first turbine stage, and a third turbine stage that is adjacent to the first turbine stage and opposite the second turbine stage, the method comprising:

securing the machine tool at least to the second turbine stage; and after the securing and while the machine tool is secured to the second turbine stage, machining the first turbine stage.

E1 The method of paragraph E, wherein the securing includes securing the machine tool to the third turbine stage.

E2 The method of any of paragraphs E-E1, wherein the securing includes securing the machine tool to the first turbine stage.

E3 The method of any of paragraphs E-E2, further comprising:

prior to the securing, engaging with the machine tool opposite ends of a pin of the one or more pins associated with the first turbine stage;

wherein the securing is performed while the machine tool is engaged with the opposite ends of the pin.

E3.1 The method of paragraph E3, wherein the engaging includes engaging the opposite ends of the pin with a pair of centering tools;

wherein the method further comprises:

after the securing, replacing at least one of the pair of centering tools with a cutting tool;

wherein the machining includes machining the first turbine stage with the cutting tool.

E4 The method of any of paragraphs E-E3.1, further comprising the method of any of paragraphs C-D4 and F-F4.

E5 The method of any of paragraphs E-E4, wherein the method is performed utilizing the machine tool of any of paragraphs A-B6.

F A method for machining a turbine rotor assembly with a machine tool, wherein the turbine rotor assembly includes a plurality of turbine stages, wherein each turbine stage is defined by a turbine wheel and a plurality of turbine blades extending from the turbine wheel, wherein each turbine blade is coupled to a respective turbine wheel by one or more pins, and wherein the plurality of turbine stages includes a first turbine stage to be machined, a second turbine stage that is adjacent to the first turbine stage, and a third turbine stage that is adjacent to the first turbine stage and opposite the second turbine stage, the method comprising:

engaging the second turbine stage;

while the second turbine stage is engaged, pushing off of the second turbine stage to translate a cutting tool toward and into contact with the first turbine stage; and while the second turbine stage is being pushed off from, penetrating the first turbine stage with the cutting tool.

F1 The method of paragraph F, wherein the cutting tool is a first cutting tool and the method further comprises:

engaging the third turbine stage;

while the third turbine stage is engaged, pushing off of the third turbine stage to translate a second cutting tool toward and into contact with the first turbine stage; and while the third turbine stage is being pushed off from, penetrating the first turbine stage with the second cutting tool.

F2 The method of any of paragraphs F-F1, further comprising:

prior to the engaging, securing the machine tool at least to the second turbine stage.

F2.1 The method of paragraph F2, wherein the securing includes securing the machine tool to the third turbine stage.

F2.2 The method of any of paragraphs F2-F2.1, wherein the securing includes securing the machine tool to the first turbine stage.

F2.3 The method of any of paragraphs F2-F2.2, further comprising:

prior to the securing, engaging opposite ends of a pin of the one or more pins associated with the first turbine stage;

wherein the securing is performed while the machine tool is engaged with the opposite ends of the pin.

F2.3.1 The method of paragraph F2.3, wherein the engaging the opposite ends includes engaging the opposite ends of the pin with a pair of centering tools;

wherein the method further comprises:

after the securing, replacing at least one of the centering tools with the cutting tool.

F3 The method of any of paragraphs F-F2.3.1, further comprising the method of any of paragraphs C-D4 and E-E5.

F4 The method of any of paragraphs F-F3, wherein the method is performed utilizing the machine tool of any of paragraphs A-B6.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

The disclosure set forth above encompasses multiple distinct inventions with independent utility. While each of these inventions has been disclosed in its preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods, and/or steps disclosed herein. Similarly, where any disclosure above or claim below recites "a" or "a first" element, step of a method, or the equivalent thereof, such disclosure or claim should be understood to include incorporation of one or more such elements or steps, neither requiring nor excluding two or more such elements or steps.

It is believed that the following claims particularly point out certain combinations and subcombinations that are directed to one of the disclosed inventions and are novel and non-obvious. Inventions embodied in other combinations and subcombinations of features, functions, elements, properties, methods, and/or steps may be claimed through amendment of the present claims or presentation of new claims in this or a related application. Such amended or new claims, whether they are directed to a different invention or directed to the same invention, whether different, broader, narrower, or equal in scope to the original claims, also are regarded as within the subject matter of the inventions of the present disclosure.

The invention claimed is:

1. A method for machining a turbine rotor assembly with a machine tool, wherein the turbine rotor assembly includes a plurality of turbine stages, wherein each turbine stage is defined by a turbine wheel and a plurality of turbine blades extending from the turbine wheel, wherein each turbine blade is coupled to a respective turbine wheel by one or more pins, and wherein the plurality of turbine stages includes a first turbine stage to be machined, a second turbine stage that is adjacent to the first turbine stage, and a third turbine stage that is adjacent to the first turbine stage and opposite the second turbine stage, the method comprising:
    engaging the second turbine stage;
    while the second turbine stage is engaged, pushing-off of the second turbine stage to translate a cutting tool toward and into contact with the first turbine stage; and
    while the second turbine stage is being pushed-off from, penetrating the first turbine stage with the cutting tool.

2. The method of claim 1, wherein the cutting tool is a first cutting tool and the method further comprises:
    engaging the third turbine stage;
    while the third turbine stage is engaged, pushing-off of the third turbine stage to translate a second cutting tool toward and into contact with the first turbine stage; and
    while the third turbine stage is being pushed-off from, penetrating the first turbine stage with the second cutting tool.

3. The method of claim 1, further comprising:
    prior to the engaging, securing the machine tool at least to the second turbine stage.

4. The method of claim 3, wherein the securing includes securing the machine tool to the third turbine stage.

5. The method of claim 3, further comprising:
    prior to the securing, engaging opposite ends of a pin of the one or more pins associated with the first turbine stage to align the machine tool with the pin;
    wherein the securing is performed while the machine tool is engaged with the opposite ends of the pin.

6. The method of claim 5,
    wherein the engaging the opposite ends of the pin includes engaging the opposite ends of the pin with a pair of centering tools;
    wherein the method further comprises:
        after the securing, replacing at least one of the centering tools with the cutting tool.

7. The method of claim 1, further comprising:
    prior to the engaging, securing the machine tool to the first turbine stage and the second turbine stage.

8. The method of claim 7, wherein the securing includes securing the machine tool to the third turbine stage.

9. The method of claim 1,
    wherein the machine tool comprises a drill arm positioned at least partially between the first turbine stage and the second turbine stage, wherein the drill arm includes the cutting tool, and wherein the drill arm performs the pushing-off of the second turbine stage.

10. The method of claim 9,
    wherein the machine tool further comprises a support frame; and
    wherein the drill arm is operatively coupled to the support frame and includes:
        a drill-arm body positioned at least partially between the first turbine stage and the second turbine stage, wherein the cutting tool is operatively coupled to the drill-arm body; and
        a second-stage push-off-mechanism having a second-stage engagement-surface, wherein the second-stage push-off-mechanism is operatively coupled to the drill-arm body and performs the pushing-off the second turbine stage by translating the second-stage engagement-surface away from the drill-arm body and toward and into contact with the second turbine stage.

11. The method of claim 10, wherein the drill-arm body is configured to be selectively translated longitudinally relative to the support frame among a plurality of longitudinal positions including an extended position and a retracted position, wherein the cutting tool is further away from the support frame when the drill-arm body is in the extended position than when the drill-arm body is in the retracted position, and wherein the method further comprises:
    prior to the engaging the second turbine stage, receiving user input to extend the drill-arm body to its extended position.

12. The method of claim 10, wherein the drill-arm body is configured to be selectively translated longitudinally relative to the support frame among a plurality of longitudinal positions including an extended position and a retracted position, wherein the cutting tool is further away from the support frame when the drill-arm body is in the extended position than when the drill-arm body is in the retracted position, and wherein the method further comprises:
    prior to the engaging, securing the machine tool at least to the second turbine stage;
    prior to the securing, receiving user input to extend the drill-arm body to its extended position;
    after the receiving user input to extend the drill-arm body to its extended position and prior to the securing, engaging opposite ends of a pin of the one or more pins associated with the first turbine stage with a pair of centering tools, wherein the securing is performed while the centering tools are engaged with the opposite ends of the pin;
    after the securing and prior to the pushing-off of the second turbine stage, receiving user input to retract the drill-arm from its extended position and to replace at least one of the pair of centering tools with the cutting tool; and after the receiving user input to replace at least one of the pair of centering tools with the cutting tool and prior to the pushing-off of the second turbine stage, receiving user input to again extend the drill-arm body to its extended position.

13. A method for machining a turbine rotor assembly with a machine tool, wherein the turbine rotor assembly includes a plurality of turbine stages, wherein each turbine stage is defined by a turbine wheel and a plurality of turbine blades extending from the turbine wheel, wherein each turbine blade is coupled to a respective turbine wheel by one or more pins, and wherein the plurality of turbine stages includes a first turbine stage to be machined, a second turbine stage that is adjacent to the first turbine stage, and a third turbine stage that is adjacent to the first turbine stage and opposite the second turbine stage, the method comprising:
- securing the machine tool at least to the second turbine stage; and
- after the securing and while the machine tool is secured to the second turbine stage, machining the first turbine stage.

14. The method of claim 13, wherein the securing includes securing the machine tool to the third turbine stage.

15. The method of claim 13, wherein the securing includes securing the machine tool to the first turbine stage.

16. The method of claim 13, further comprising:
- prior to the securing, engaging with the machine tool opposite ends of a pin of the one or more pins associated with the first turbine stage;
- wherein the securing is performed while the machine tool is engaged with the opposite ends of the pin.

17. The method of claim 16,
- wherein the engaging includes engaging the opposite ends of the pin with a pair of centering tools;
- wherein the method further comprises:
  - after the securing, replacing at least one of the pair of centering tools with a cutting tool; and
- wherein the machining includes machining the first turbine stage with the cutting tool.

* * * * *